United States Patent
Rosko et al.

(10) Patent No.: US 9,795,255 B2
(45) Date of Patent: *Oct. 24, 2017

(54) ELECTRONIC SOAP DISPENSER

(71) Applicant: DELTA FAUCET COMPANY, Indianapolis, IN (US)

(72) Inventors: Michael Scot Rosko, Greenwood, IN (US); Alfred Charles Nelson, Westfield, IN (US); Jeffrey Lee Moore, Frankfort, IN (US); Randy L. Schneider, II, Carmel, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,235

(22) Filed: Dec. 30, 2015

(65) Prior Publication Data

US 2016/0106272 A1  Apr. 21, 2016

Related U.S. Application Data

(63) Continuation of application No. 14/168,857, filed on Jan. 30, 2014, now Pat. No. 9,271,613.

(60) Provisional application No. 61/765,501, filed on Feb. 15, 2013.

(51) Int. Cl.
*A47K 5/12* (2006.01)
*G01D 5/24* (2006.01)

(52) U.S. Cl.
CPC .......... *A47K 5/1217* (2013.01); *A47K 5/1211* (2013.01); *G01D 5/24* (2013.01); *A47K 2005/1218* (2013.01); *A47K 2210/00* (2013.01)

(58) Field of Classification Search
CPC ................ A47K 5/1217; A47K 5/1211; A47K 2005/1218; A47K 2210/00; G01D 5/24
See application file for complete search history.

(56) References Cited

U.S. PATENT DOCUMENTS

| | | | |
|---|---|---|---|
| 5,255,822 A | 10/1993 | Mease et al. | |
| 6,209,751 B1 | 4/2001 | Goodin et al. | |
| 6,467,651 B1 * | 10/2002 | Muderlak | A47K 5/1217 222/333 |
| 6,651,851 B2 | 11/2003 | Muderlak et al. | |
| 6,731,209 B2 | 5/2004 | Wadlow et al. | |
| 6,903,654 B2 | 6/2005 | Hansen et al. | |
| 6,929,150 B2 | 8/2005 | Muderlak et al. | |
| 6,977,588 B2 | 12/2005 | Schotz et al. | |
| 6,995,670 B2 | 2/2006 | Wadlow et al. | |

(Continued)

OTHER PUBLICATIONS

Hammacher Schlemmer; The Touch Free Soap Dispenser; 2012; retrieved from the internet at.http://www.hammacher.com/publish/74626.asp.

(Continued)

*Primary Examiner* — Frederick C Nicolas
*Assistant Examiner* — Bob Zadeh
(74) *Attorney, Agent, or Firm* — Faegre Baker Daniels LLP

(57) ABSTRACT

An electronic soap dispenser includes an upper dispensing head supported above a sink deck, and a liquid soap reservoir and a pump assembly supported below the sink deck. A capacitive sensor is operably coupled to the dispensing head. A controller is in electrical communication with the capacitive sensor and activates the pump assembly in response to input from the capacitive sensor.

27 Claims, 33 Drawing Sheets

(56) References Cited

U.S. PATENT DOCUMENTS

| | | | |
|---|---|---|---|
| 7,025,227 B2* | 4/2006 | Oliver | A47K 5/1217 222/180 |
| 7,102,366 B2 | 9/2006 | Denen et al. | |
| 7,296,765 B2 | 11/2007 | Rodrian | |
| 7,374,066 B2 | 5/2008 | Jackson et al. | |
| 7,533,787 B2 | 5/2009 | Muderlak et al. | |
| 7,540,397 B2 | 6/2009 | Muderlak et al. | |
| 7,556,179 B2 | 7/2009 | Yang et al. | |
| 7,611,033 B2 | 11/2009 | Ganzeboom | |
| 7,611,317 B2 | 11/2009 | Muderlak et al. | |
| 7,681,765 B2 | 3/2010 | Muderlak | |
| 7,766,189 B2 | 8/2010 | Shaw et al. | |
| 7,770,754 B2 | 8/2010 | Shaw et al. | |
| 7,783,380 B2 | 8/2010 | York et al. | |
| 7,815,077 B2 | 10/2010 | Yang et al. | |
| 7,830,160 B2 | 11/2010 | Philipp | |
| 7,952,233 B2 | 5/2011 | Bayley et al. | |
| 7,963,475 B2 | 6/2011 | Rodrian | |
| 8,011,538 B2 | 9/2011 | Herman et al. | |
| 8,087,543 B2 | 1/2012 | Yang et al. | |
| 8,096,445 B2 | 1/2012 | Yang et al. | |
| 8,100,299 B2 | 1/2012 | Phelps et al. | |
| 8,109,411 B2 | 2/2012 | Yang et al. | |
| 8,201,707 B2 | 6/2012 | Ophardt | |
| 8,261,941 B2 | 9/2012 | Woo et al. | |
| 9,271,613 B2* | 3/2016 | Rosko | A47K 5/1217 |
| 2002/0175182 A1 | 11/2002 | Matthews | |
| 2007/0063158 A1* | 3/2007 | Parsons | E03C 1/05 251/129.04 |
| 2008/0109956 A1 | 5/2008 | Bayley et al. | |
| 2009/0266842 A1 | 10/2009 | Snodgrass | |
| 2009/0308887 A1 | 12/2009 | Woo et al. | |
| 2010/0051642 A1 | 3/2010 | Wong et al. | |
| 2010/0213208 A1* | 8/2010 | Bem | A47K 5/12 222/52 |
| 2011/0011888 A2 | 1/2011 | Beavis et al. | |
| 2011/0017778 A1 | 1/2011 | Kadiks et al. | |
| 2011/0024449 A1 | 2/2011 | Walters et al. | |
| 2011/0095051 A1 | 4/2011 | Liao et al. | |
| 2011/0114669 A1 | 5/2011 | Yang et al. | |
| 2011/0253220 A1 | 10/2011 | Sawaski et al. | |
| 2012/0048894 A1 | 3/2012 | Tatu et al. | |
| 2012/0058025 A1 | 3/2012 | Fienup et al. | |
| 2012/0061415 A1 | 3/2012 | Hagleitner | |
| 2012/0085776 A1 | 4/2012 | Babikian | |
| 2012/0097711 A1 | 4/2012 | Xianzhi et al. | |
| 2012/0111885 A1 | 5/2012 | Binderbauer et al. | |
| 2012/0131744 A1 | 5/2012 | Bayley et al. | |
| 2012/0187152 A1 | 7/2012 | Zhou et al. | |
| 2014/0231450 A1* | 8/2014 | Rosko | A47K 5/1217 222/52 |
| 2016/0106272 A1* | 4/2016 | Rosko | A47K 5/1217 222/52 |

OTHER PUBLICATIONS

Premier; Premier 552028 Premier Soap Dispenser; 2012; retrieved from the internet at http:/lightingshowplace.com/premier-552028-premier-soap-dispenser/p1297167?source=CJ_3726866_10592330.

Premier, Model 555028 Soap Dispenser, Brochure, 2012.

* cited by examiner

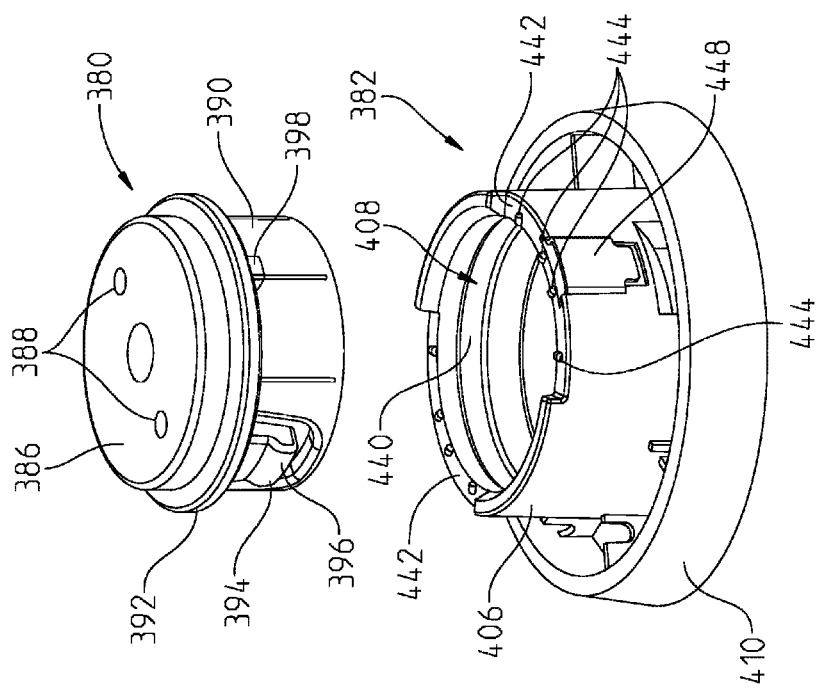
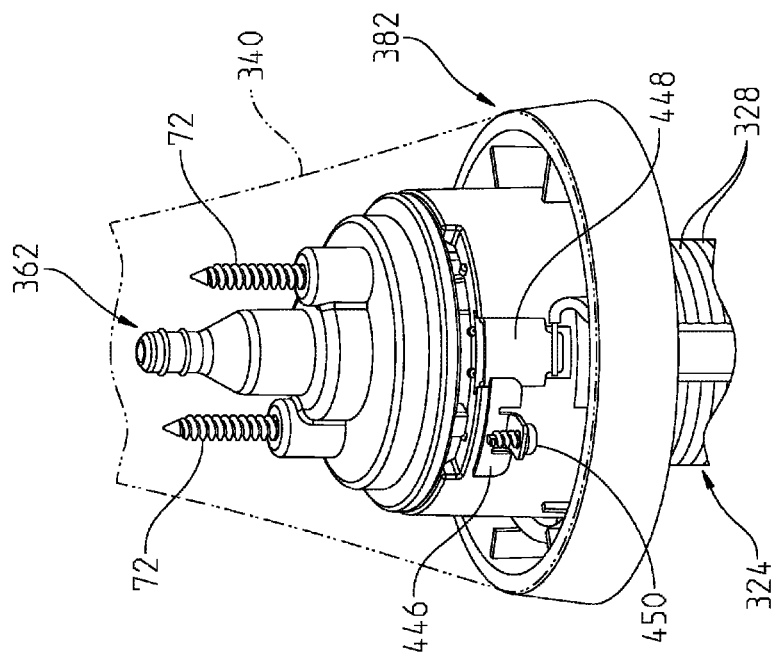

ELECTRONIC SOAP DISPENSER

CROSS-REFERENCE OR RELATED APPLICATION

The present application is a continuation of U.S. patent application Ser. No. 14/168,857, filed Jan. 30, 2014, which claims priority to U.S. Provisional Patent Application, Ser. No. 61/765,501, filed Feb. 15, 2013, the disclosures of which are expressly incorporated herein by reference.

BACKGROUND AND SUMMARY OF THE INVENTION

The present invention relates generally to a soap dispenser and, more particularly, to a sink deck mounted electronic soap dispenser for simple operation and ease of maintenance.

Electronic soap dispensers including sensors for hand-free operation are known in the art. Such electronic soap dispensers may include infrared or capacitive sensors to detect the presence of a user and dispense soap in response thereto.

The present disclosure relates to an electronic soap dispenser that includes a controller to actuate a pump in response to input from a capacitive sensor. Additionally, the electronic soap dispenser of the present disclosure includes a mounting structure to support a dispensing head above a mounting deck, and to support a reservoir and pump assembly below the mounting deck.

According to an illustrative embodiment of the present disclosure, an electronic soap dispenser includes a dispensing head configured to be supported above a mounting deck and including an outlet. A lower reservoir is operably coupled to the dispensing head and is configured to be supported below the mounting deck. A pump assembly is operably coupled to the lower reservoir. The pump assembly is configured to be supported below the mounting deck and to pump liquid soap from the lower reservoir to the outlet of the dispensing head. A capacitive sensor is operably coupled to the dispensing head. A controller is in electrical communication with the capacitive sensor. The controller is configured to receive an output signal from the capacitive sensor and to distinguish between a proximity output signal from the capacitive sensor when a user is positioned in a detection area near the dispensing head, and a touch output signal from the capacitive sensor when a user touches the dispensing head.

According to a further illustrative embodiment of the present disclosure, an electronic soap dispenser includes a dispensing head configured to be supported above a mounting deck and including a spout body. A dispensing tube is received within the spout body and defines an outlet. A lower reservoir is configured to be supported below the mounting deck. The lower reservoir includes an upper neck operably coupled to the dispensing head. A pump assembly is operably coupled to the lower reservoir and is configured to pump liquid soap from the lower reservoir to the outlet of the dispensing tube. A supply tube extends within the lower reservoir. The supply tube extends from a lower end fluidly coupled to the pump assembly to an upper end extending within the upper neck of the reservoir. A tube retainer secures the lower end of the dispensing tube to the spout body. The tube retainer includes a downwardly facing funnel portion receiving the upper end of the supply tube to define a releasable fluid coupling between the dispensing tube extending above the mounting deck and the supply tube extending below the mounting deck.

According to another illustrative embodiment of the present disclosure, an electronic soap dispenser includes a dispensing head having a spout body. A mounting base is configured to be supported above a mounting deck and releasably coupled to the dispensing head. A lower reservoir is operably coupled to the dispensing head and is configured to be supported below the mounting deck. A pump assembly is operably coupled to the lower reservoir and is configured to pump liquid soap from the lower reservoir to the dispensing head. A controller is in electrical communication with the pump assembly. An electrical connector is positioned between the dispensing head and the controller. The electrical connector includes a first contact supported for movement by the dispensing head, and a second contact in selective electrical communication with the first contact supported on the mounting base wherein the electrical connector is configured to maintain electrical communication as the dispensing head is rotated relative to the mounting base.

According to a further illustrative embodiment of the present disclosure, an electronic soap dispenser includes a dispensing head configured to be supported above a mounting deck and including an outlet. A reservoir is operably coupled to the dispensing head. A pump assembly is operably coupled to the reservoir and is configured to pump liquid soap from the reservoir to the outlet of the dispensing head. A capacitive sensor is operably coupled to the dispensing head. A controller is in electrical communication with the capacitive sensor. The controller is configured to receive a touch output signal from the capacitive sensor when a user touches the dispensing head. The controller is further configured to dispense a liquid soap for a set dispensing duration in response to the touch output signal when operating in a dispensing mode, and to selectively change the set dispensing duration in response to successive touch output signals when operating in a programming mode.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 26 is a perspective view similar to FIG. 24 with the spout body rotationally located in an intermediate clockwise position;

FIG. 27 is an exploded perspective view showing an illustrative releasable coupling of the retaining hub and the mounting base;

DETAILED DESCRIPTION OF THE DRAWINGS

Figure 1:
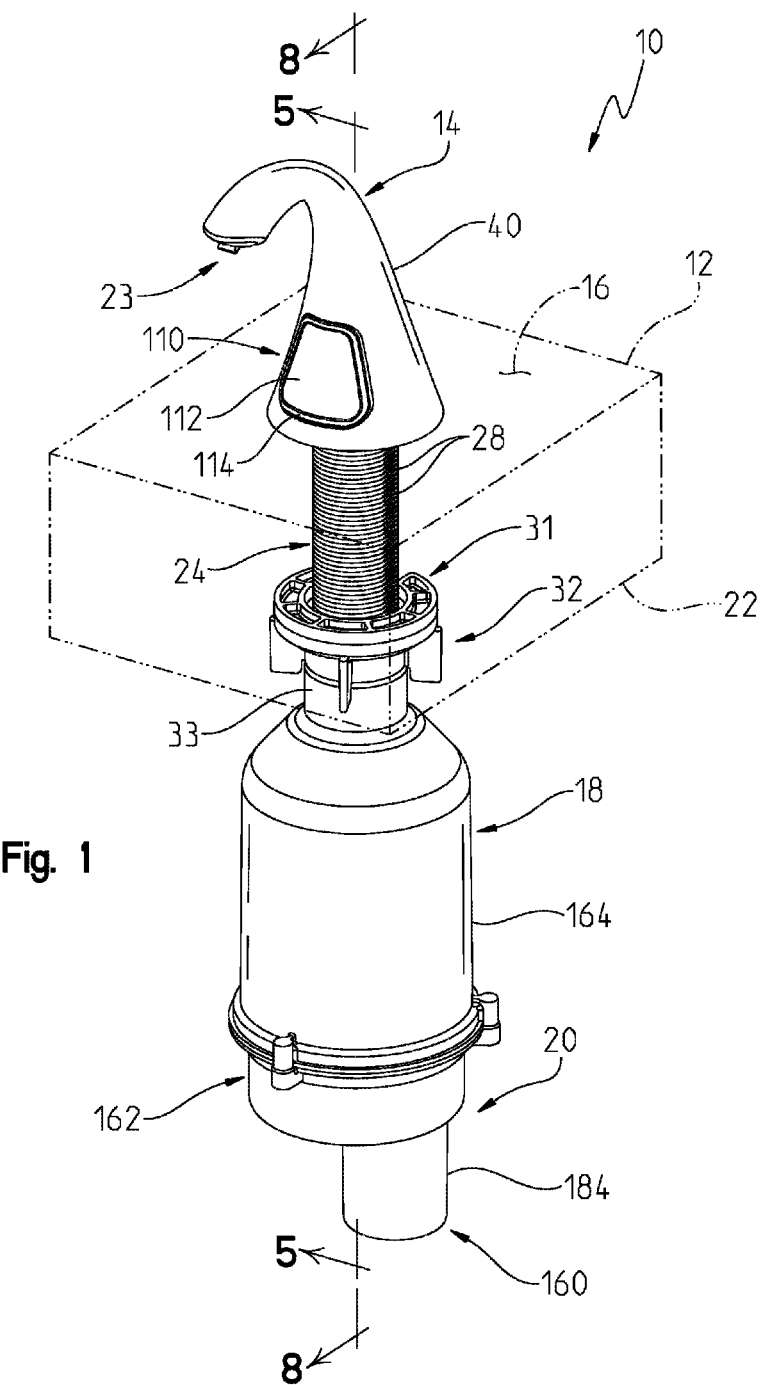
FIG. 1 is a perspective view of an illustrative electronic soap dispenser of the present disclosure coupled to a mounting deck shown in phantom.

The embodiments of the invention described herein are not intended to be exhaustive or to limit the invention to precise forms disclosed. Rather, the embodiments elected for description have been chosen to enable one skilled in the art to practice the invention.

Referring initially to FIGS. 1-4, an illustrative electronic soap pump or dispenser 10 is shown coupled to a mounting deck, illustratively a sink deck 12. An upper dispensing spout or head 14 extends above an upper surface 16 of the sink deck 12, while a lower soap reservoir 18 and pump assembly 20 are supported below a lower surface 22 of the sink deck 12. The pump assembly 20 is configured to propel liquid soap from within the lower soap reservoir 18 to a dispensing outlet 23 of the dispensing head 14.

Figure 7:
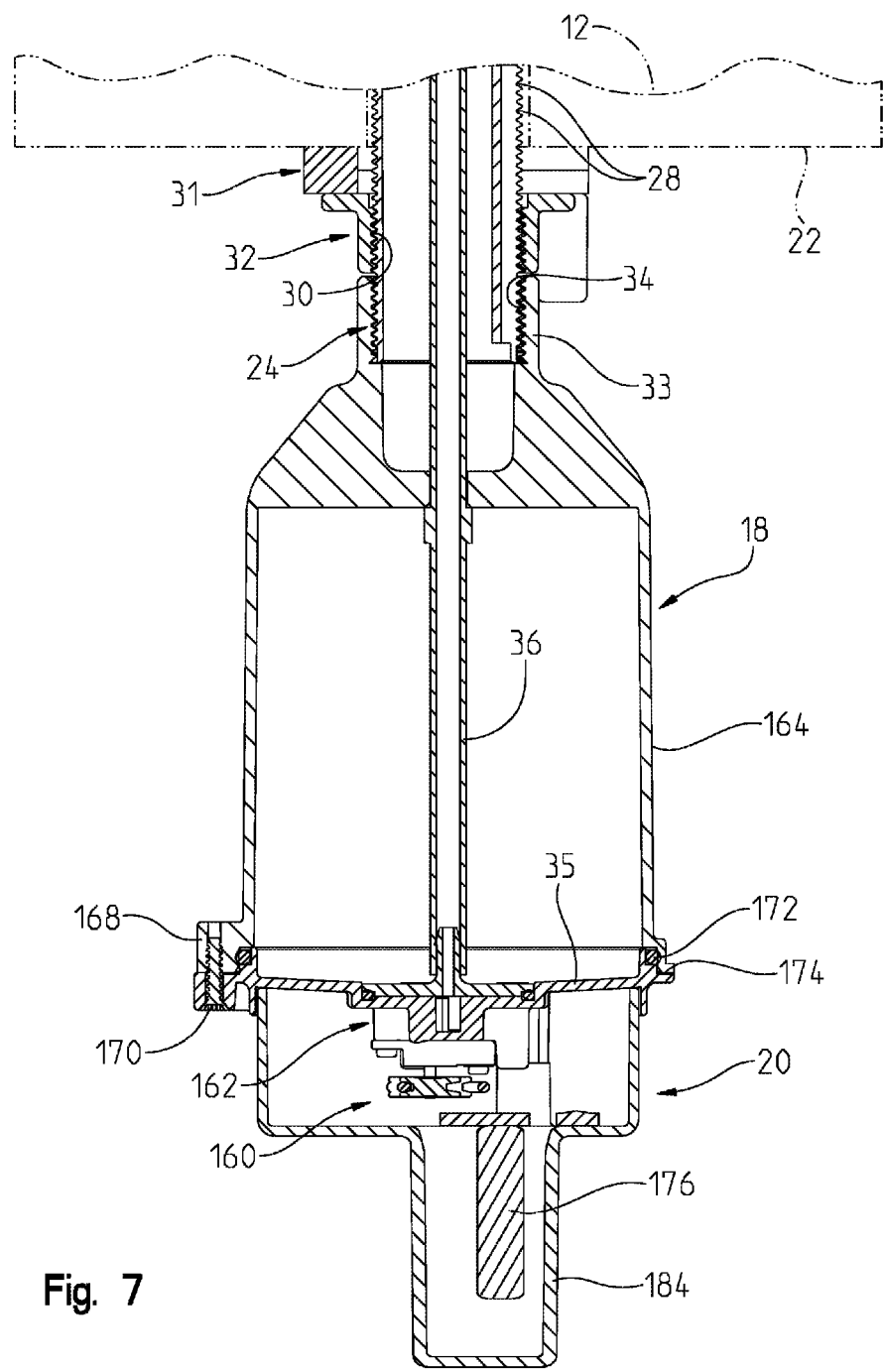
FIG. 7 is a detailed lower cross-sectional view of FIG. 5, showing the reservoir and the pump assembly extending below the mounting deck.

A mounting shank 24 extends downwardly through an opening 26 in the sink deck 12 and secures both the dispensing head 14 and the lower soap reservoir 18 to the sink deck 12. The mounting shank 24 includes external threads 28 that engage with internal threads 30 of a mounting nut 32 (FIG. 7). The mounting nut 32 may be of conventional design and formed of a polymer. A mounting spacer 31, illustratively a split annular ring formed of a polymer, may be positioned intermediate the mounting nut 32 and the sink deck 12. The sink deck 12 is clamped between the dispensing head 14 and the mounting nut 32. An open upper neck 33 of the reservoir 18 includes internal threads 34 coupled to the external threads 28 of the mounting shank 24, while a lower bottom wall 35 of the reservoir 18 supports the pump assembly 20 (FIG. 7). A supply tube or straw 36 extends axially through the soap reservoir 18 and fluidly couples the pump assembly 20 and the dispensing head 14.

The dispensing head 14 illustratively includes a hollow spout body 40 receiving a dispensing tube 42. The spout body 40 is illustratively formed of a metal or polymer, such as a chromed acrylonitrile butadiene styrene (ABS). The dispensing tube 42 is illustratively formed of a flexible polymer, such as a cross-linked polyethylene (PEX), and extends within a hollow passageway 43 of the spout body 40. A lower end 44 of the dispensing tube 42 is in fluid communication with an upper end 46 of the supply tube 36, and an upper end 48 of the dispensing tube 42 defines the dispensing outlet 23.

Figure 2:
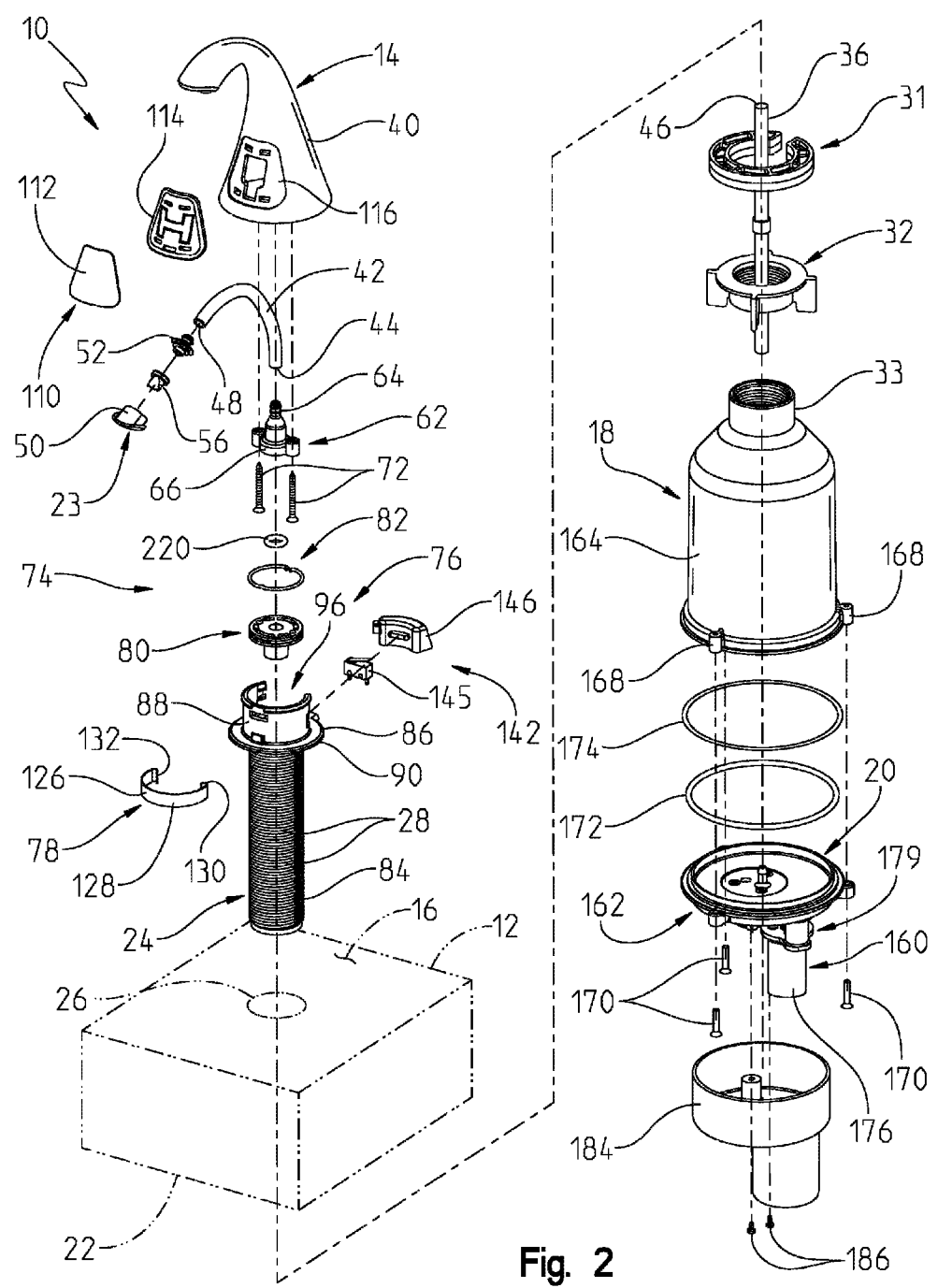
FIG. 2 is a front exploded perspective view of the electronic soap dispenser of FIG. 1.
Figure 3:
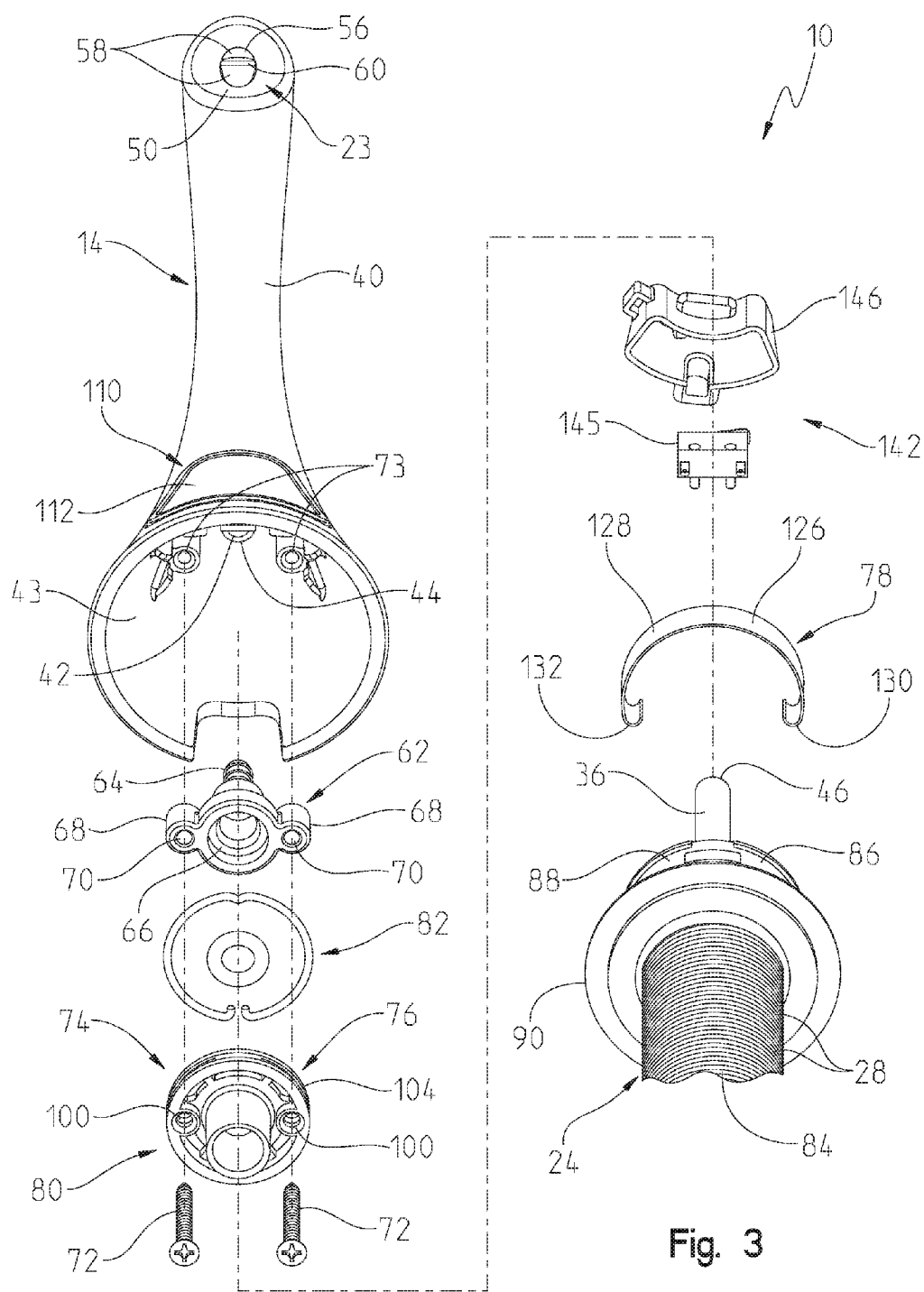
FIG. 3 is a partial bottom exploded perspective view of the electronic soap dispenser of FIG. 1.

With reference to FIGS. 2-4 and 6, a tip or nozzle 50 is secured to the outlet 23 by a retainer 52. More particularly, the retainer 52 includes a barbed fitting 54 received within the upper end 48 of the dispensing tube 42. A check valve 56 is illustratively coupled intermediate the tip 50 and the retainer 52 to prevent dripping of liquid soap from the outlet 23. The check valve 56 may be of conventional design as including a pair of opposing flaps 58 defining a dispensing slot 60 (FIG. 3). The check valve 56 is illustratively formed of a resilient material, such as an elastomer or polymer, such as a silicone.

Figure 4:
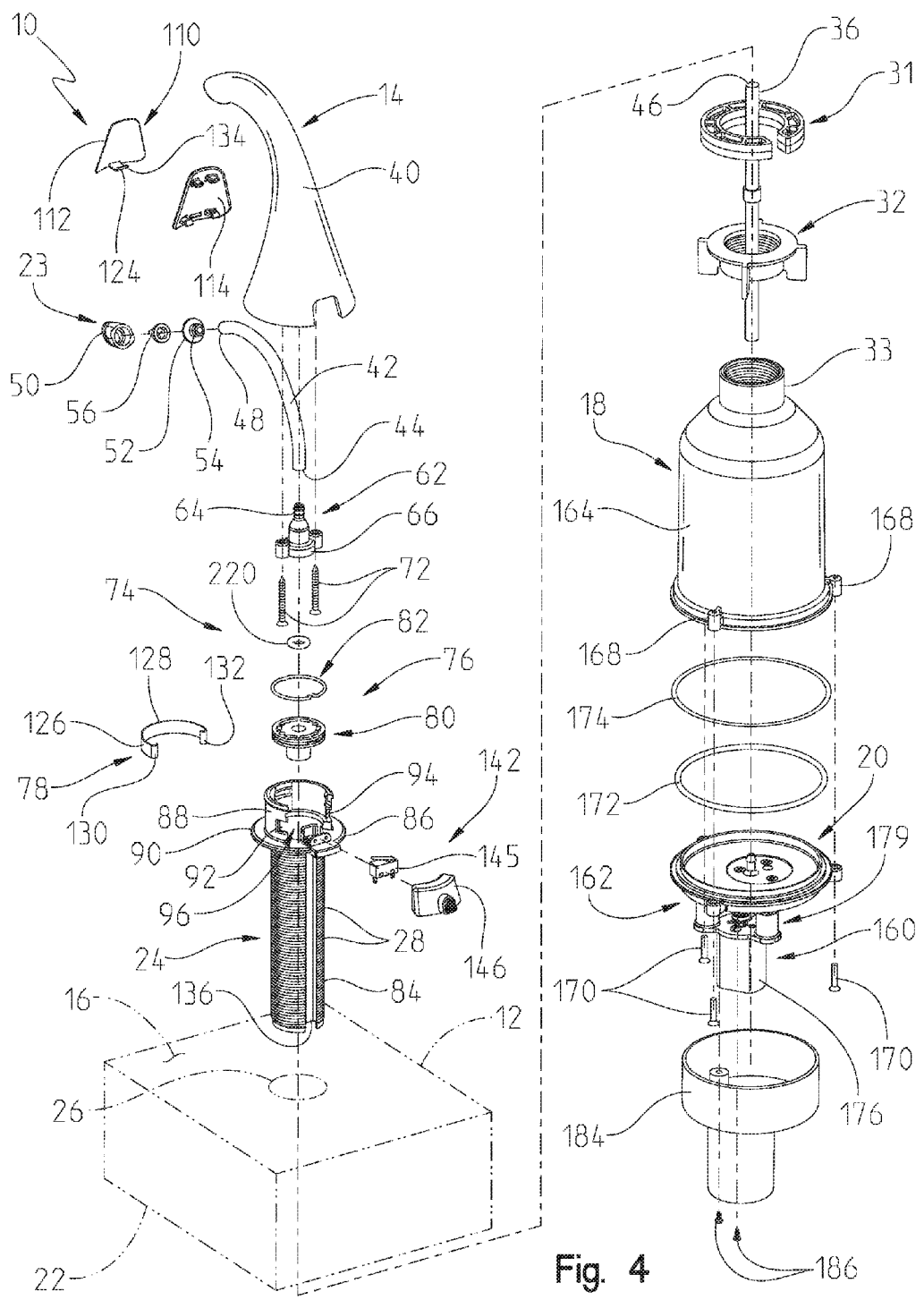
FIG. 4 is a rear exploded perspective view of the electronic soap dispenser of FIG. 1.

With further reference to FIGS. 2-4, a hose or tube retainer 62 secures the lower end 44 of the dispensing tube 42 to the spout body 40. The tube retainer 62 may be formed of a polymer, such as an acetal copolymer, and illustratively includes an upper barbed fitting 64 and a tapered lower receiving chamber or funnel 66. The upper barbed fitting 64 is secured within the dispensing tube 42, while the lower receiving chamber 66 receives the upper end 46 of the supply tube 36. A pair of mounting bosses 68 including openings 70 to receive fasteners, such as screws 72, to secure the tube retainer 62 within retaining bosses 73 of the spout body 40 (FIG. 3).

A releasable coupler 74 couples the spout body 40 to the mounting shank 24 to facilitate removal of the dispensing head 14 from the sink deck 12 for refilling the reservoir 18 with liquid soap from above the sink deck 12 and/or replacing the dispensing head 14 with different styles or designs. Illustratively, the releasable coupler 74 includes a structural coupling or connector 76 between the dispensing head 14 and the mounting shank 24, and an electrical coupling or connector 78 between the dispensing head 14 and the pump assembly 20.

In one illustrative embodiment, the structural connector 76 of the releasable coupler 74 includes a retainer cap 80, and a retaining clip 82 supported by the spout body 40. The mounting shank 24 includes a lower threaded portion 84 supporting the external threads 28, and an upper mounting base 86 including an arcuate upper wall 88 and a flange 90. Opposing ends 92 and 94 of the upper wall 88 define an opening 96. A passageway 98 within the mounting shank 24 receives the supply tube 36. The flange 90 separates the upper wall 88 from the lower threaded portion 84 of the mounting shank 24 and rests on the upper surface 16 of the sink deck 12. The mounting shank 24 is illustratively formed of an electrically non-conductive material, such as a polymer. As such, the mounting base 86 of the mounting shank 24 defines an electrical insulator between the dispensing head 14 and the sink deck 12.

Figure 6:
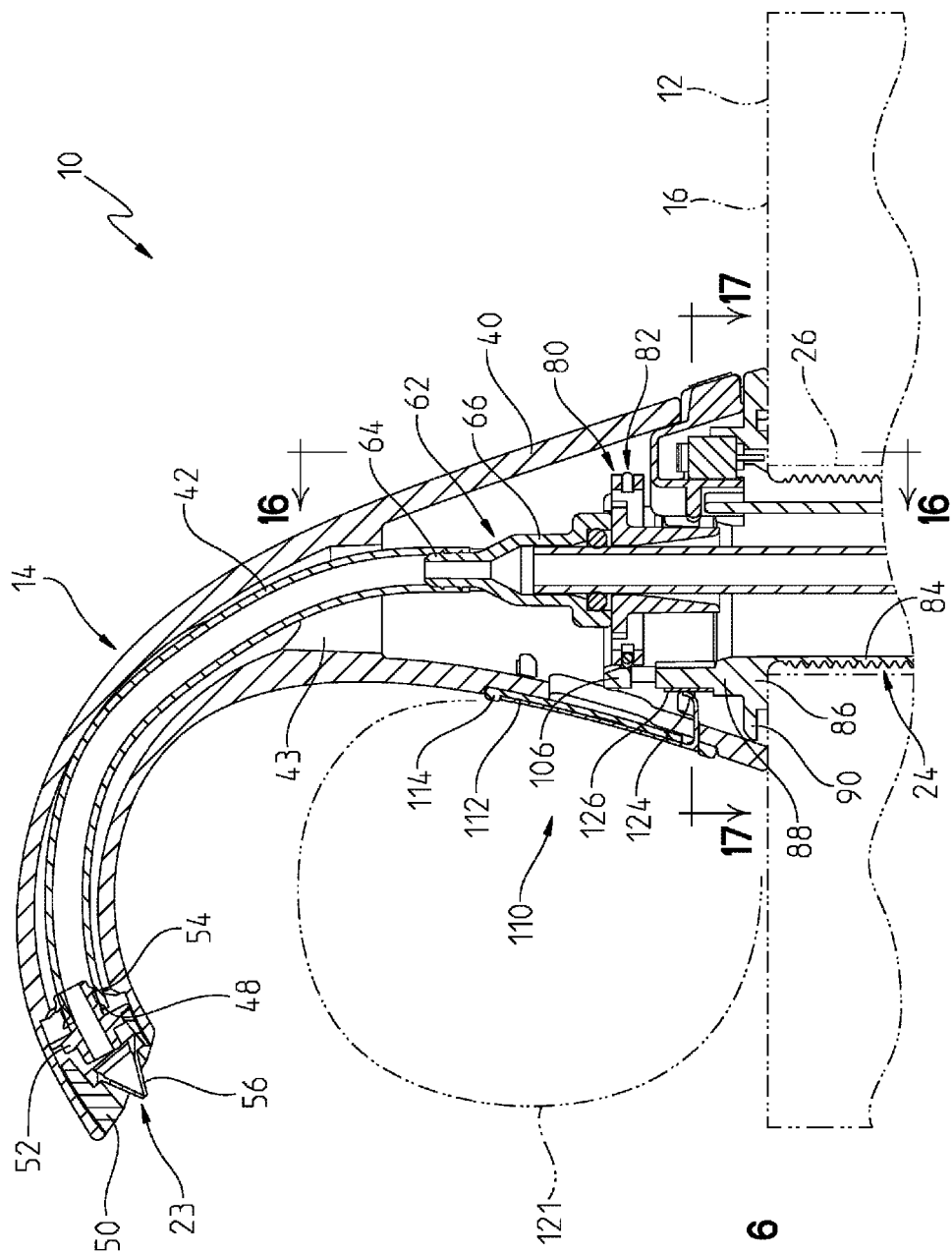
FIG. 6 is a detailed upper cross-sectional view of FIG. 5, showing the dispensing spout extending above the mounting deck.
Figure 15:
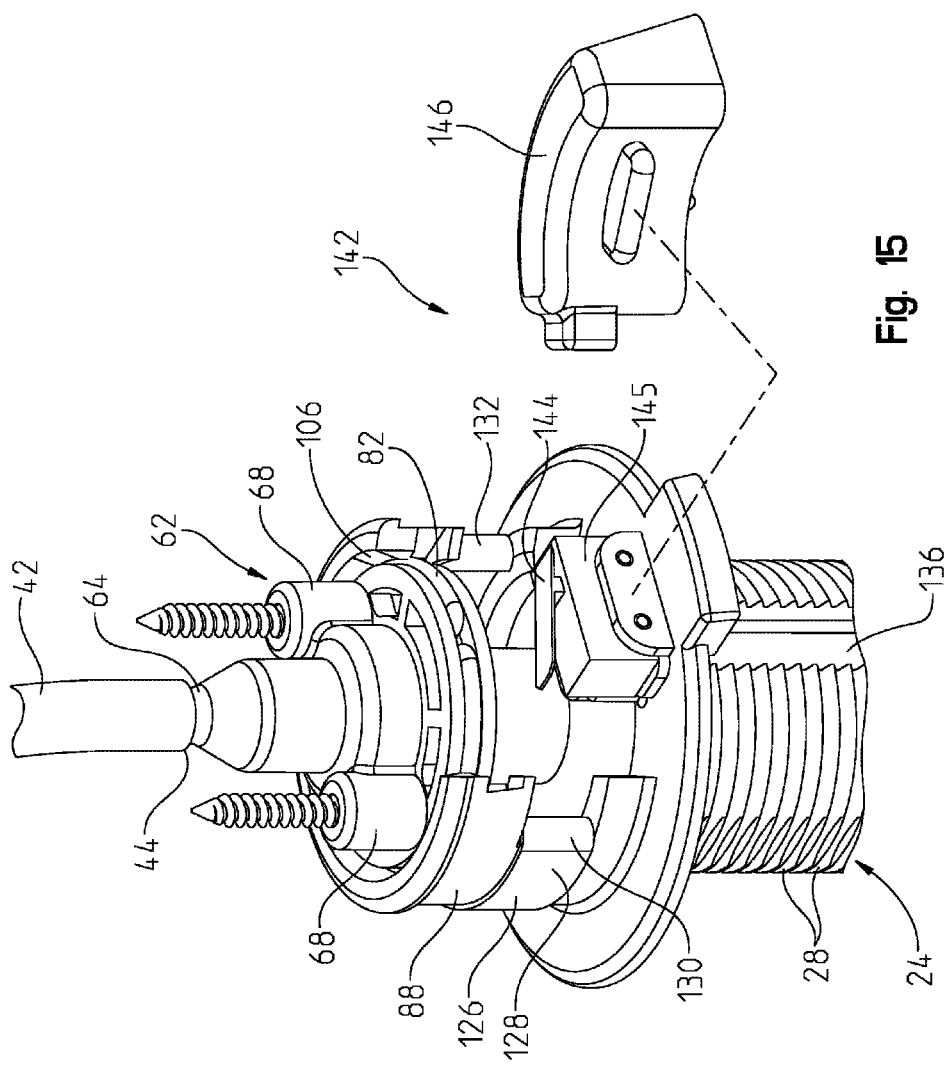
FIG. 15 is a perspective view of the switch assembly similar to FIG. 14, with the input button removed from the switch.

With reference to FIGS. 3, 6 and 15, the retainer cap 80 may be formed of a polymer and illustratively includes openings 100 to receive screws 72 for securing to the tube retainer 62 and the spout body 40. The retaining clip 82, illustratively a wire snap ring, is received within an annular groove 104 formed within the retainer cap 80. The retaining clip 82 secures the spout body 40 to the mounting shank 24. More particularly, the retaining clip 82 extends radially outwardly to be retained by inwardly extending tabs 106 supported by the arcuate upper wall 88 of the mounting shank 24.

With reference to FIGS. 1-4 and 13, an input member or electrode 110, illustratively an electrically conductive sensing plate or touch pad 112, may be coupled to the spout body 40. More particularly, the sensing plate 112 is coupled to a sensing plate insulator 114 which, in turn, is supported within a recess 116 formed in the spout body 40. The sensing plate 112 is formed of an electrically conductive material, such as a chromed stainless steel, and is electrically coupled to a capacitive sensor 118. The sensing plate insulator 114 is formed of an electrically insulating material, such as a polymer.

Figure 13:
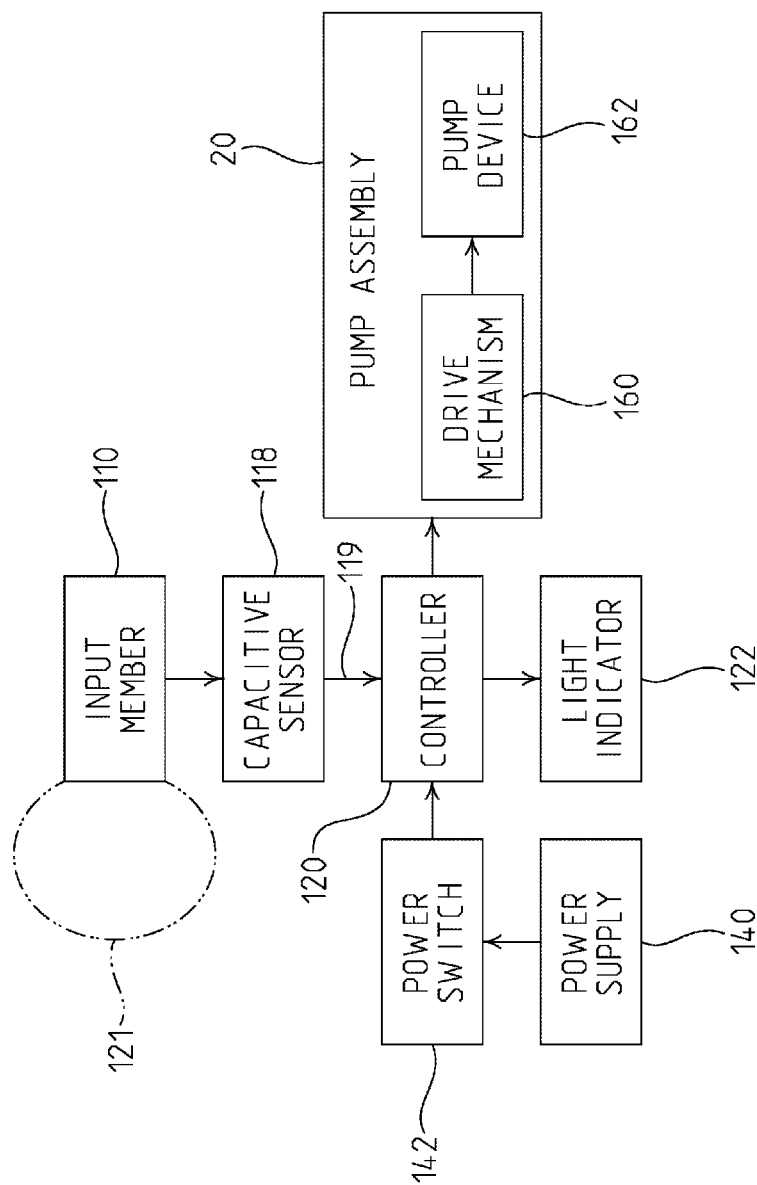
FIG. 13 is a block diagram illustrating communication between components of the electronic soap dispenser of FIG. 1.

With reference to FIG. 13, the capacitive sensor 118 is electrically coupled to a controller 120, which may be supported by a printed circuit board (PCB). As further detailed herein, an output signal 119 from the capacitive sensor 118 is provided by the controller 120. The capacitive sensor 118 is illustratively used for both a touch sensor and a hands free proximity sensor. In the hands free mode of operation, the capacitive sensor 118 and the controller 120 detect a user's hands or other object within a detection area 121 located near the input member 110 of the dispensing head 14 (FIGS. 6 and 13).

In certain illustrative embodiments, a light indicator 122, such as one of more light emitting diodes (LEDs) may be positioned within the insulator 114 to provide illumination around the sensing plate 112 during different operating conditions of the dispenser 10, such as when the pump assembly 20 is dispensing liquid soap. As further detailed herein, while a separate input member 110 such as sensing plate 112 may be coupled to the spout body 40 to provide a capacitive input to the capacitive sensor 118, other input members may be substituted therefor. For example, and as further detailed herein, the spout body 40 itself may define the input member 110 when at least partially formed of an electrically conductive material.

As noted above, the electrical connector 78 defines a releasable electrical coupling between the dispensing head 14 and the pump assembly 20 for selective electrical communication therebetween. The electrical connector 78 provides communication between the capacitive input member 110 above the sink deck 12 and electronics below the sink deck 12. This quick disconnect feature allows a user to remove the spout body 40, for example, when refilling the soap reservoir 18, without dealing with a wired connection between the mounting base 86 and the spout body 40.

Figure 17:
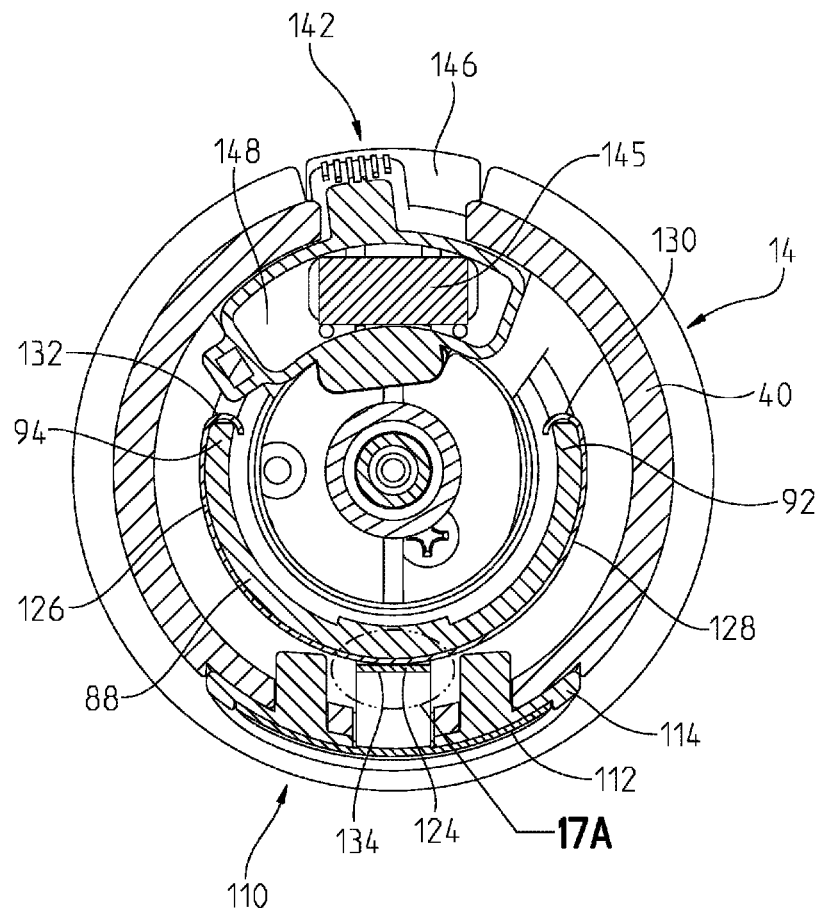
FIG. 17 is a cross-sectional view taken along line 17-17 of FIG. 6.

With reference to FIGS. 4, 15 and 17, the electrical connector 78 illustratively includes a first electrical contact 124 supported for movement by the dispensing head 14, and a second electrical contact 126 in selective electrical communication with the first electrical contact 124 supported by the mounting base 86 of the mounting shank 24. The electrical connector 78 is configured to maintain electrical communication between the contacts 124 and 126 as the dispensing head 14 is rotated within a predetermined angular range relative to the mounting base 86.

Figure 17A:
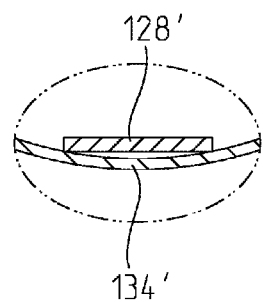
FIG. 17A is a detailed view of FIG. 17 showing an alternative electrical connector.

The second electrical contact 126 illustratively includes an electrically conductive arcuate strip or band 128 extending circumferentially outside the wall 88 of the mounting shank 24. Illustratively, the band 128 is formed of a metal strip, such as copper or brass. Opposing ends 130 and 132 of the band 128 are bent or wrapped around ends 92 and 94 of the upper wall 88 of the mounting shank 24. The first electrical contact 124 illustratively includes a connecting tab 134 providing electrical communication between the sensing plate 112 and the capacitive sensor 118. Illustratively, the tab 134 is formed as an integral part of the sensing plate 112 (FIG. 4) and may be formed of a metal, such as copper or brass. As may be appreciated, the positions of the arcuate band 128' and the tab 134' may be reversed (FIG. 17A). Conventional wires or cables (not shown) may couple the conductive band 128 to the capacitive sensor 118. A channel 136 may be formed in the mounting shank 24 to receive the wires or cables extending between the dispensing head 14 and under deck electrical components (e.g., the pump assembly 20).

Figure 14:
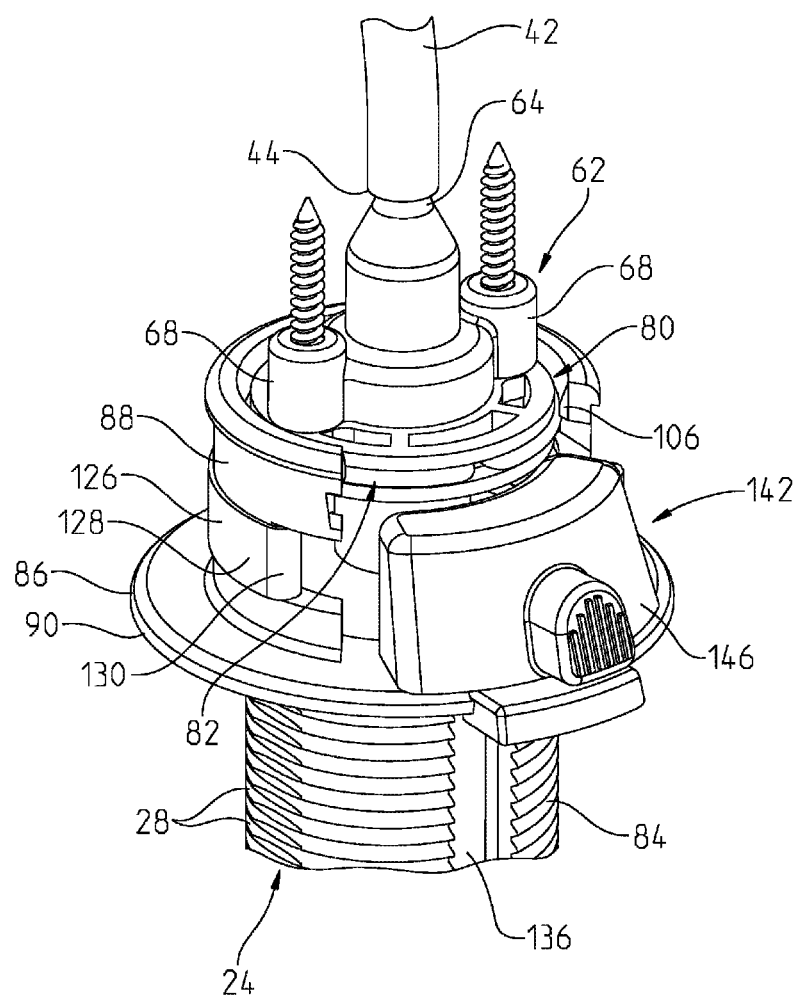
FIG. 14 is a perspective view of the switch assembly within the dispensing head of FIG. 1.
Figure 16:
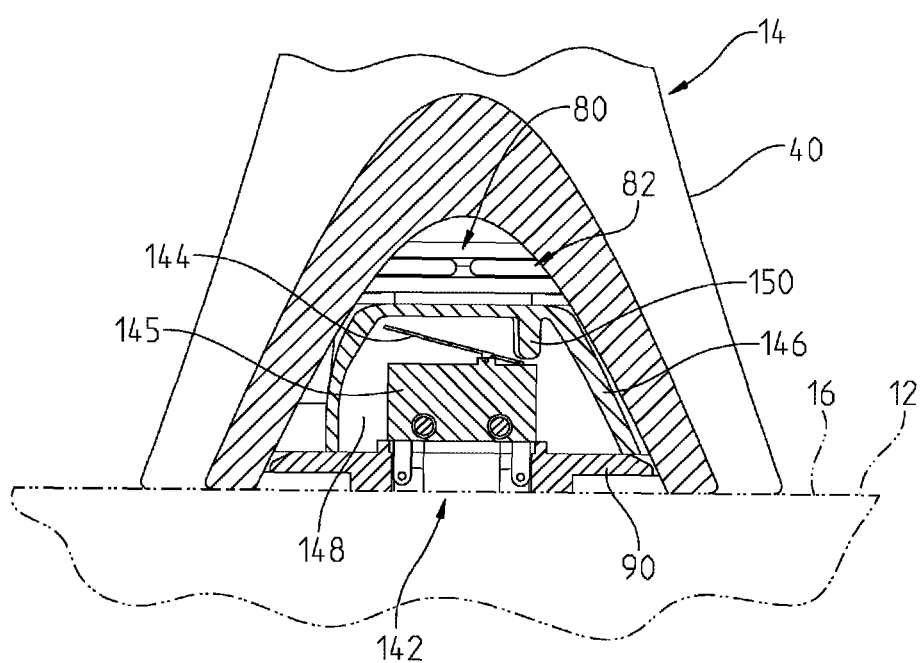
FIG. 16 is a detailed cross-sectional view of the switch of FIG. 15 taken along line 16-16 of FIG. 6.

With reference to FIG. 13, a conventional power supply 140 illustratively provides power to the controller 120. The power supply 140 may comprise a conventional AC power connection with an AC/DC convertor, or a battery. A power switch 142 is provided to selectively supply power to the controller 120. As shown in FIGS. 14-16, the power switch 142 may be of conventional design and illustratively includes a lever contact 144 in a normally open position and supported by a base 145. A slide switch housing 146 is operably coupled to the power switch 142. The slide switch housing 146 is retained on the spout body 40 for sliding movement between on and off positions. The housing 146 defines a chamber 148 receiving the base 145 and lever contact 144. As the housing 146 is slidably moved, a protrusion 150 engages the lever contact 144 of the power switch 142 to close the lever contact 144. As such, sliding the housing 146 causes the lever contact 144 to toggle between on and off positions.

Figure 10:
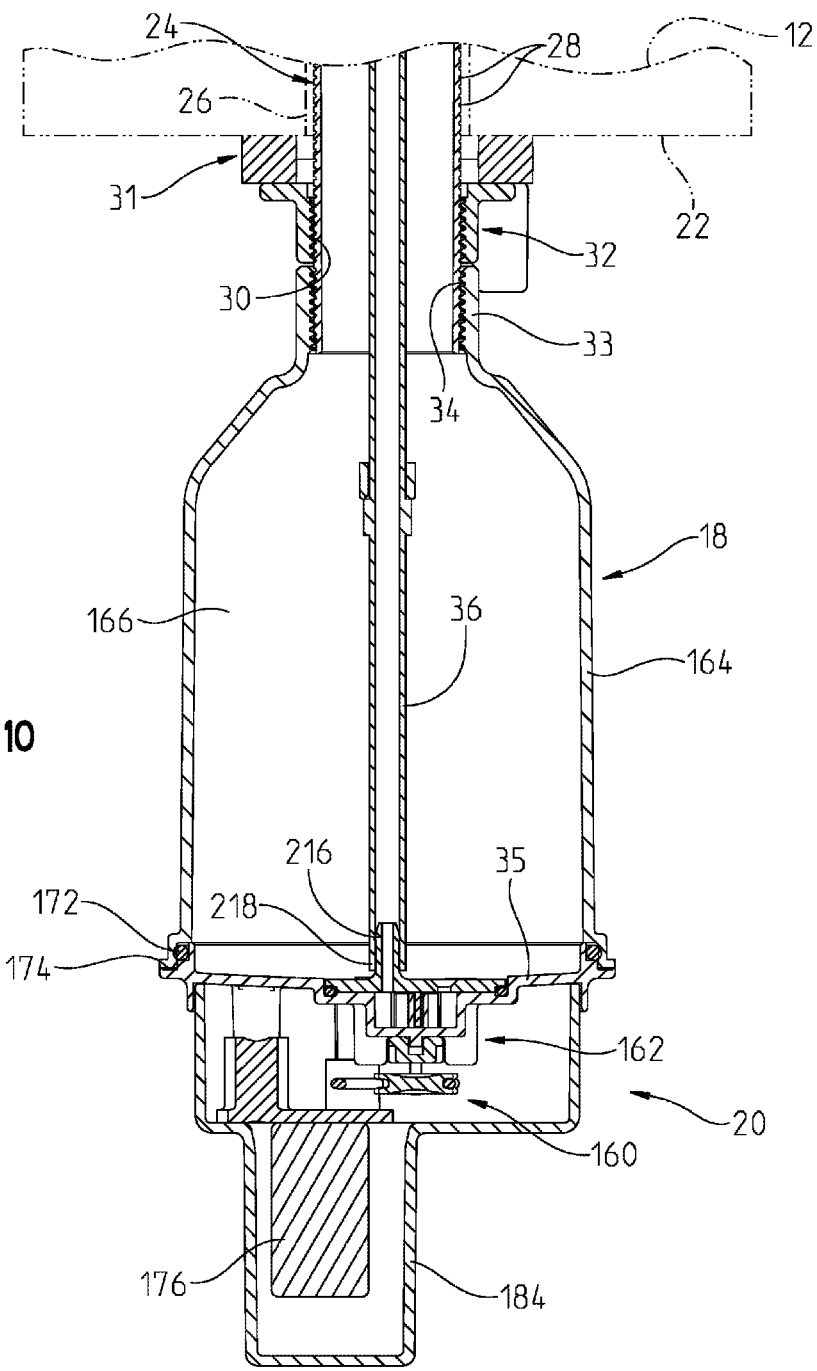
FIG. 10 is a detailed lower cross-sectional view of FIG. 8, showing the reservoir and the pump assembly extending below the mounting deck.
Figure 11:
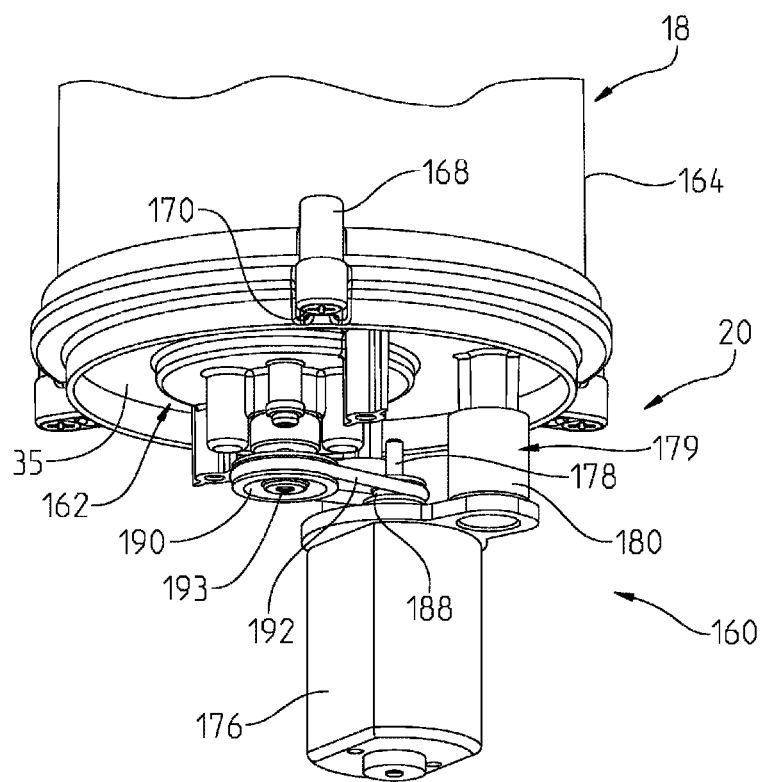
FIG. 11 is a lower perspective view of the drive mechanism of the electronic soap dispenser of FIG. 1.

With reference to FIGS. 10 and 11, the pump assembly 20 is supported by the soap reservoir 18 and illustratively includes a drive mechanism 160 operably coupled to a pump device 162. The soap reservoir 18 includes a cylindrical side wall 164 defining a chamber 166 to store liquid soap. The soap reservoir 18 generally defines a bottle formed of a polymer. The upper neck 33 of the reservoir 18 includes internal threads 34 to couple with external threads 28 of the mounting shank 24. The bottom wall 35 of the reservoir 18 supports the pump assembly 20 and is secured to bosses 168 supported by the side wall 164 through fasteners, such as screws 170. An o-ring 172 provides a radial seal, and a gasket 174 provides a face seal between the bottom wall 35 and the side wall 164 of the reservoir 18. In alternative embodiments, the bottom wall 35 may be secured to the side wall 164 in other conventional manners, such as adhesives or ultrasonic welding.

Figure 8:
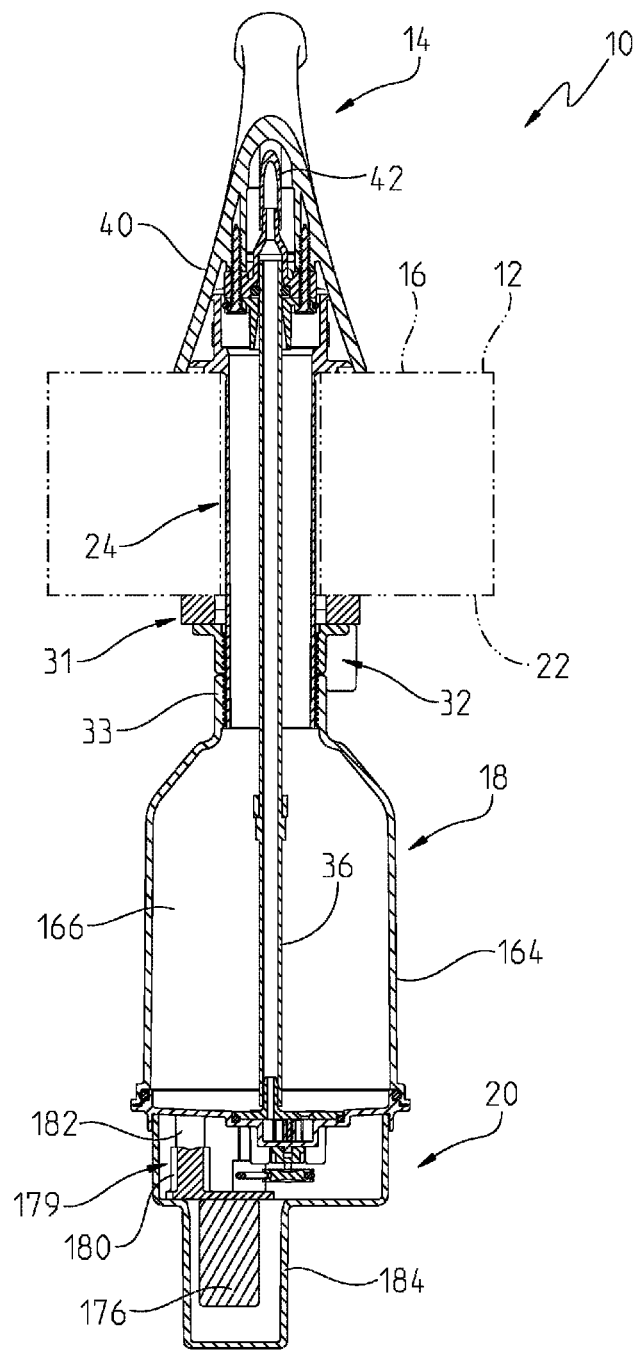
FIG. 8 is a cross-sectional view taken along line 8-8 of FIG. 1.
Figure 9:
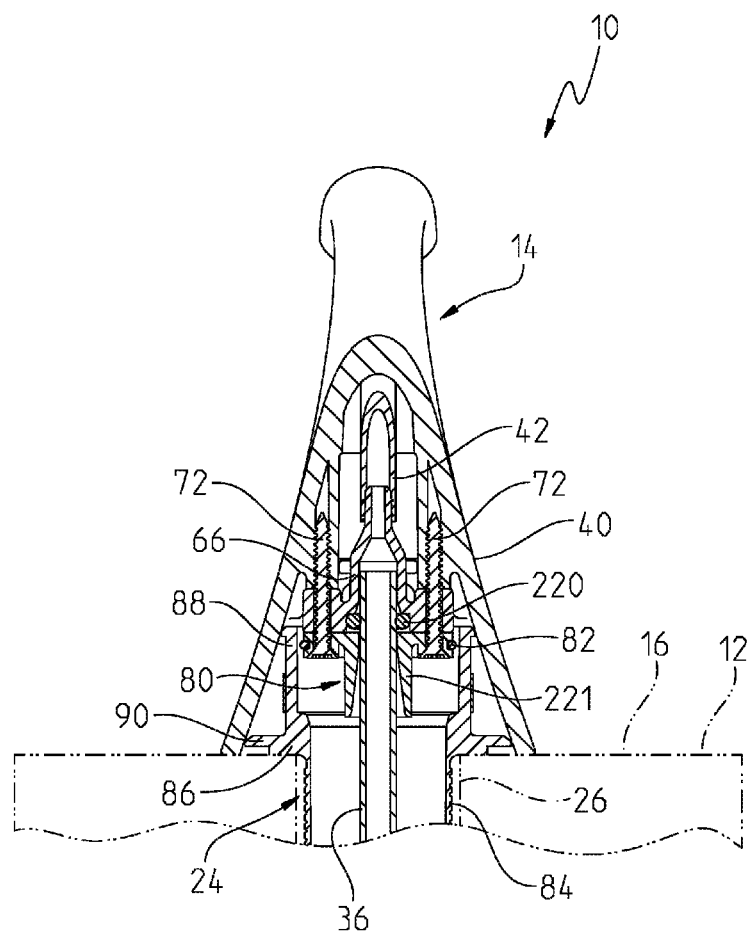
FIG. 9 is a detailed upper cross-sectional view of FIG. 8, showing the dispensing spout extending above the mounting deck.

With reference to FIGS. 10-13, the drive mechanism 160 illustratively includes an electric motor 176 having a rotatable drive shaft 178 and operably coupled to the controller 120. The electric motor 176 is illustratively supported below the bottom wall 35 by a motor mount 179. The motor mount 179 includes a pair of receiving bosses 180 receiving a pair of posts 182 extending downwardly from the bottom wall 35 (FIG. 8). The drive mechanism 160 is retained within a motor cover 184 which, in turn, is secured to the bottom wall 35 by fasteners, such as screws 186. The motor cover 184 is illustratively formed of a polymer and protects the drive mechanism 160 from debris.

The drive mechanism 160 further includes a first or drive pulley 188 coupled to drive shaft 178 of the motor 176. A second or driven pulley 190 is coupled to the first pulley 188 by a flexible belt 192. The second pulley 190 is supported by a rotatable shaft 193. The pump device 162 illustratively includes a pair of gears 194 and 196 operably coupled to the motor 176. More particularly, a first or drive gear 194 is supported on the shaft 193 driven by the second pulley 190. A second or driven gear 196 is supported by a stud or post 198 extending upwardly from the bottom wall 35 of the soap reservoir 18. Cooperating teeth 202 and 204 of the gears 194 and 196 mesh to force liquid soap from the reservoir 18 up the supply tube 36.

Figure 12:
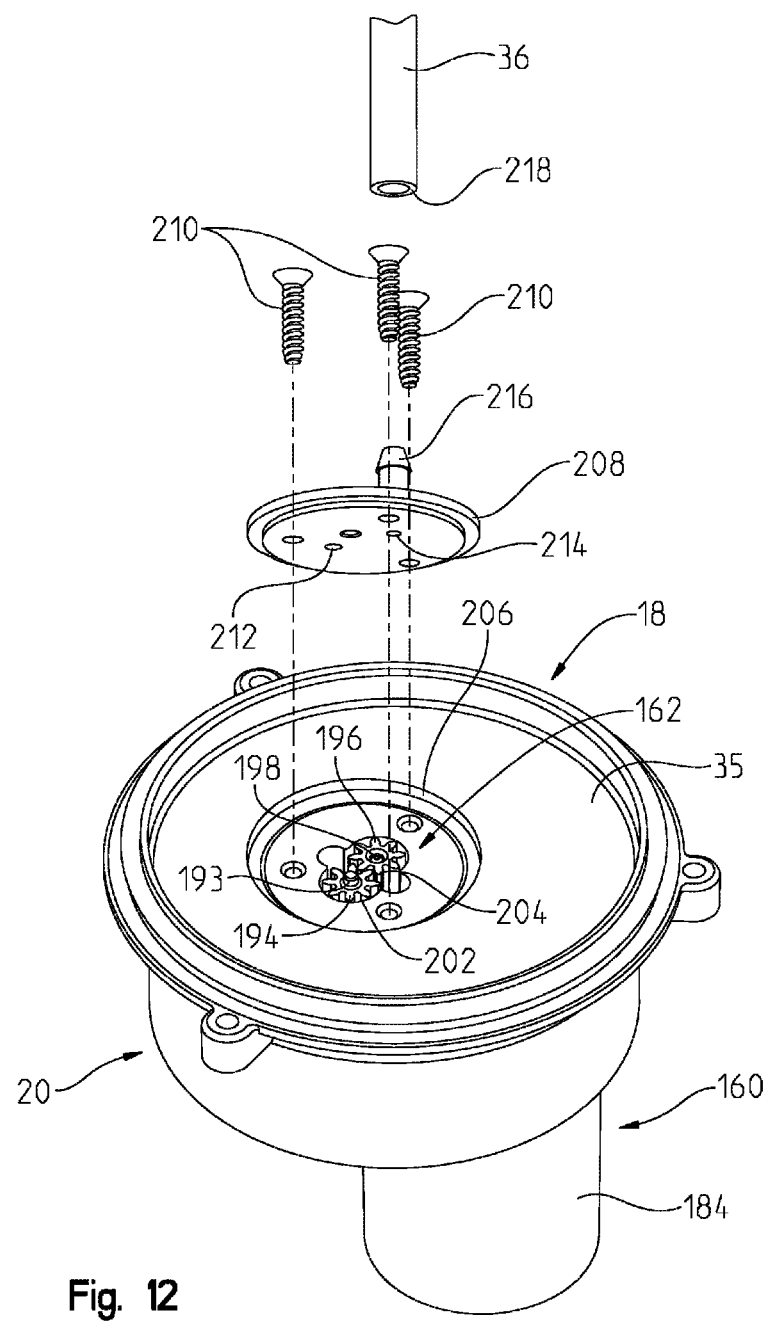
FIG. 12 is a partially exploded perspective view of the pump assembly of the electronic soap dispenser of FIG. 1.

With reference to FIG. 12, the gears 194 and 196 are received within a recess 206 formed in the bottom wall 35. A gear cover 208 is positioned above the gears 194 and 196 and is secured to the bottom wall 35 by a plurality of fasteners, such as screws 210. The gear cover 208 includes an inlet port 212 and an outlet port 214 on opposite sides of where the gear teeth 202 and 204 mesh. The outlet port 214 is defined by an upwardly extending nipple 216 received within the lower end 218 of the supply tube 36.

The supply tube 36 extends upwardly through the reservoir 18 and into the dispensing head 14. More particularly, the lower end 218 of the supply tube 36 is fluidly coupled to the outlet port 214 of the gear cover 208, while the upper end 46 of the supply tube 36 is received within the receiving chamber 66 of the tube retainer 62. As such, the dispensing tube 36 extends axially the full length of the soap reservoir 18 from proximate the bottom wall 35 through the sink deck 12 and into the dispensing head 14.

With reference to FIGS. 5-10, the dispensing tube 36 defines a rigid straw that extends from the bottom of the reservoir 18 upwardly and is releasably coupled to the dispensing tube 42. The funnel 66 of the tube retainer 62 and a cooperating seal 220 on the dispensing head 14 receives upper end 48 of the dispensing tube 42 to assist with assembly of the dispensing head 14 to the mounting base 86 of the mounting shank 24. The retainer cap 80 also illustratively includes a tapered receiving chamber 221 to guide the upper end of the dispensing tube 42 to the tube retainer 62.

Figure 5:
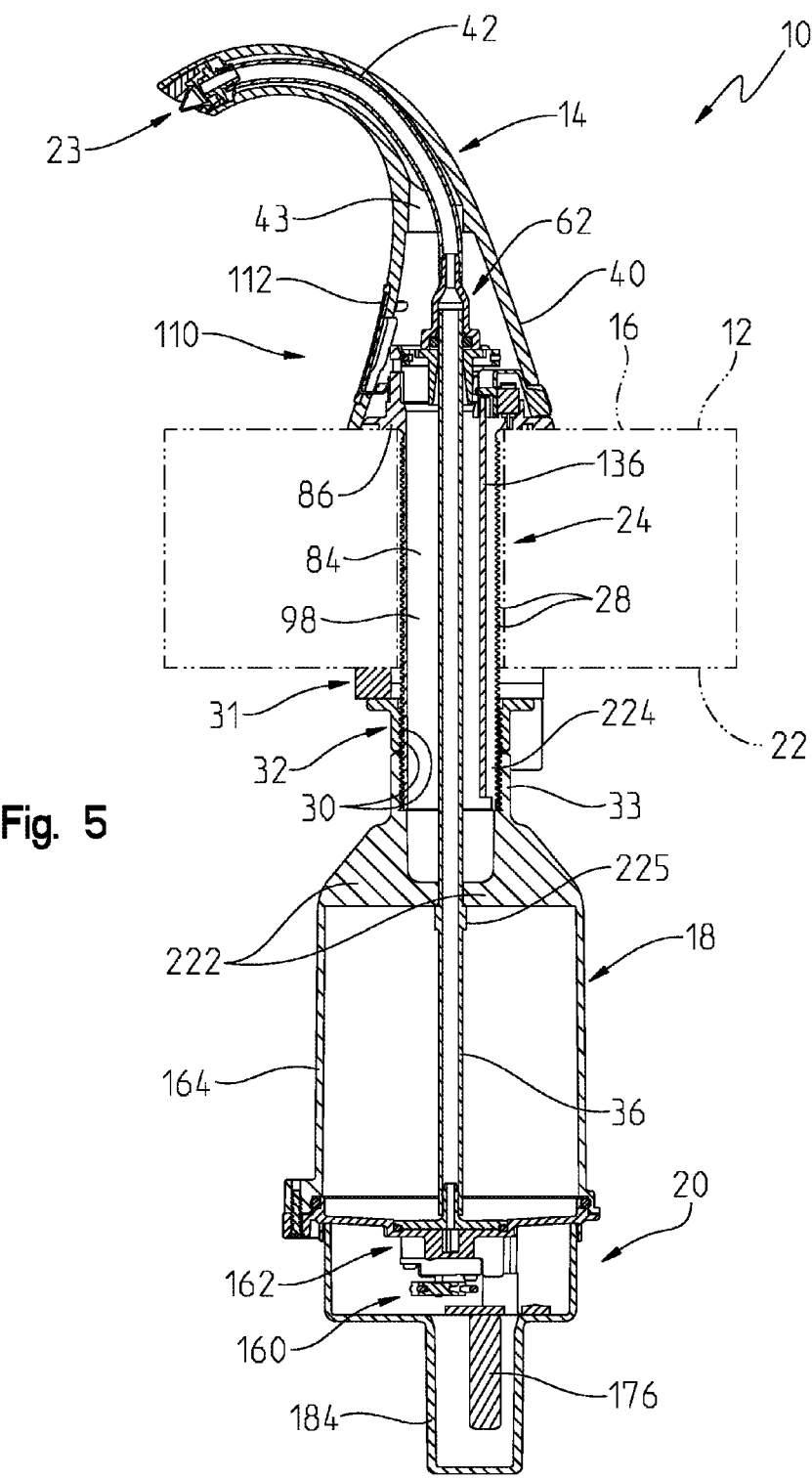
FIG. 5 is a cross-sectional view taken along line 5-5 FIG. 1.

With reference to FIG. 5, support walls or ribs 222 support the dispensing tube 42 below the inlet 224 of the lower reservoir 18 in order to facilitate refilling the reservoir 18 with liquid soap from above the sink deck 12. More particularly, the upper end 48 of the dispensing tube 42 is concentrically received within the neck 33 of the reservoir such that when the dispensing head 14 is removed, liquid soap may be poured into inlet 224 of the neck 33 defined around the dispensing tube 42. A funnel (not shown) may be used to facilitate refilling the reservoir 18 with liquid soap. A flange 225 is illustratively formed on the tube 36 below the support ribs 222 to prevent inadvertent removal of the tube 36 from the reservoir 18.

As detailed above, the dispensing head 14 is illustratively coupled to the mounting shank 24 via a releasable coupler 74 for ease of filling the soap reservoir 18. More particularly, the dispensing head 14 may be removed from the mounting shank 24 for refilling the lower reservoir 18 from above the sink deck 12 and/or replacing the dispensing head 14 with different styles or designs.

In operation, the controller 120 is powered when the power switch 142 is moved to the on position. The light indicator 122 may be illuminated when the soap dispenser 10 is powered and/or when the pump device 162 is actively dispensing soap. Flashing patterns or different colors of the light indicator 122 may provide different indications to the user, such as dispensing mode (proximity vs. touch). The pump assembly 20 may be touch controlled using a touch sensor, or activated by a proximity sensor when an object (such as a user's hands) are within the detection zone or area 121 to toggle water flow on and off.

Output signal 119 from the capacitive sensor 118 may be supplied to the controller 120 to control the motor 176 of the pump assembly 20, which thereby controls the flow of liquid soap from the reservoir 18 to the outlet 23 of the dispensing head 14. By sensing capacitance changes with capacitive sensor 118, the controller 120 can make logical decisions to control different modes of operation of dispenser 10. For example, in one illustrative embodiment, the controller 120 may operate in a proximity mode of operation where the pump assembly 20 dispenses a predetermined quantity of liquid soap (i.e., for a set dispensing duration), and a touch mode of operation where the pump assembly 20 continuously dispenses liquid soap as long as contact is maintained. In another illustrative embodiment, the controller 120 may cause the pump assembly 20 to dispense a predetermined quantity of liquid soap (i.e., for a set dispensing duration) in the touch mode of operation, and be inactive in proximity mode of operation.

The controller 120 may include a timer such that dispensing of liquid soap automatically stops after a predetermined amount of time to protect against potential malfunctions or misuse of the dispenser 10. In another illustrative embodiment, the pump assembly 20 dispenses a single quantity (i.e., "shot") of soap with each tap. For example, the controller 120 causes one shot of soap in response to a single tap, two shots of soap in response to two taps, etc.

In one illustrated embodiment, the capacitive sensor 118 is a CapSense capacitive sensor available from Cypress Semiconductor Corporation or other suitable capacitive sensor. In this illustrated embodiment, the capacitive sensor 118 converts capacitance into a count value. The unprocessed count value is referred to as a raw count. Processing the raw count signal determines whether the dispensing head 14 is touched or whether a user's hands are in the detection area 121. Additional details of an illustrative capacitive sensing system for use in a fluid delivery device are disclosed in U.S. patent application Ser. No. 12/763,690, filed Apr. 20, 2010, the disclosure of which is expressly incorporated herein by reference.

Figure 18:
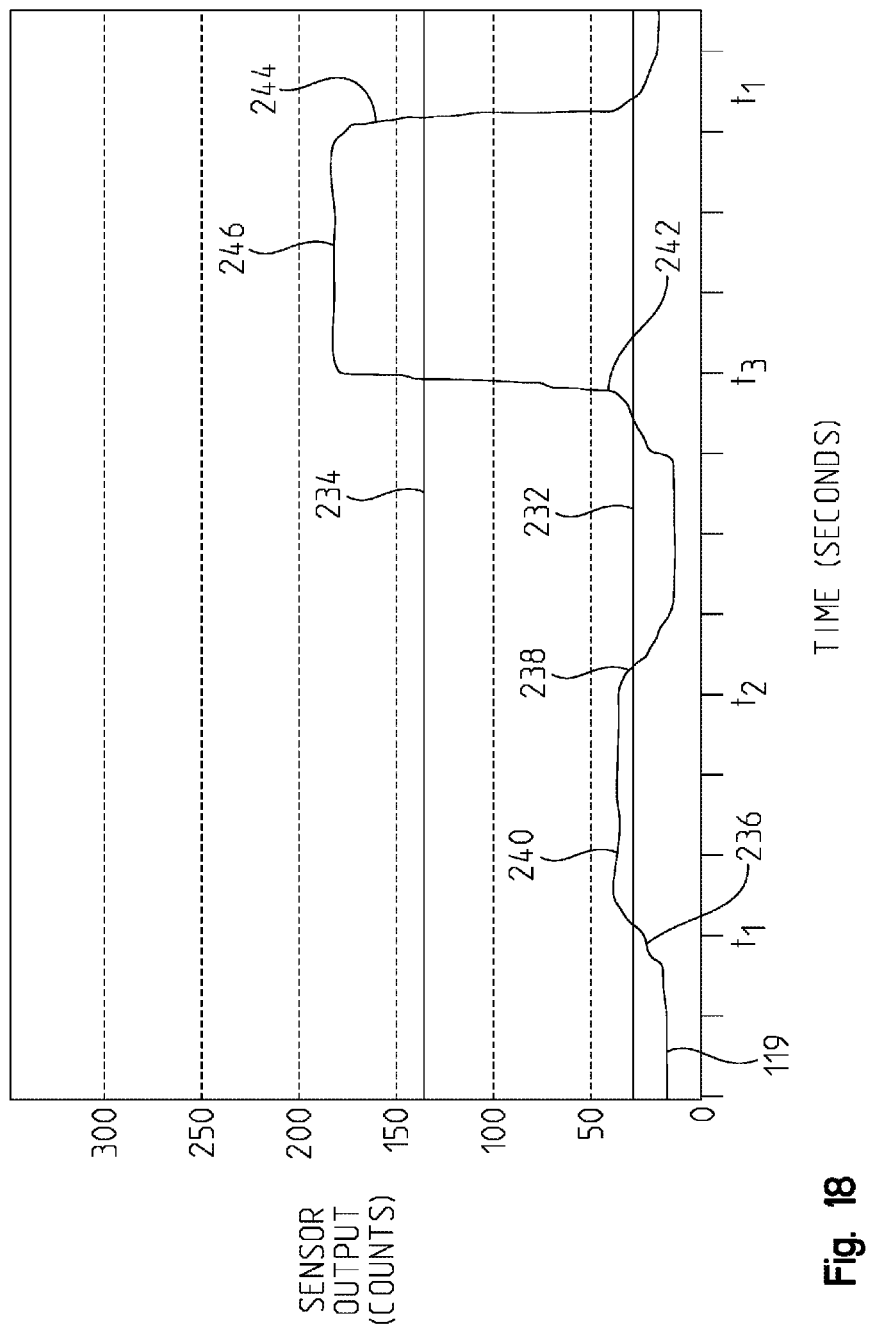
FIG. 18 illustrates exemplary capacitive signal outputs in response to a user located within a detection zone and a user touching the dispensing head.
Figure 19:
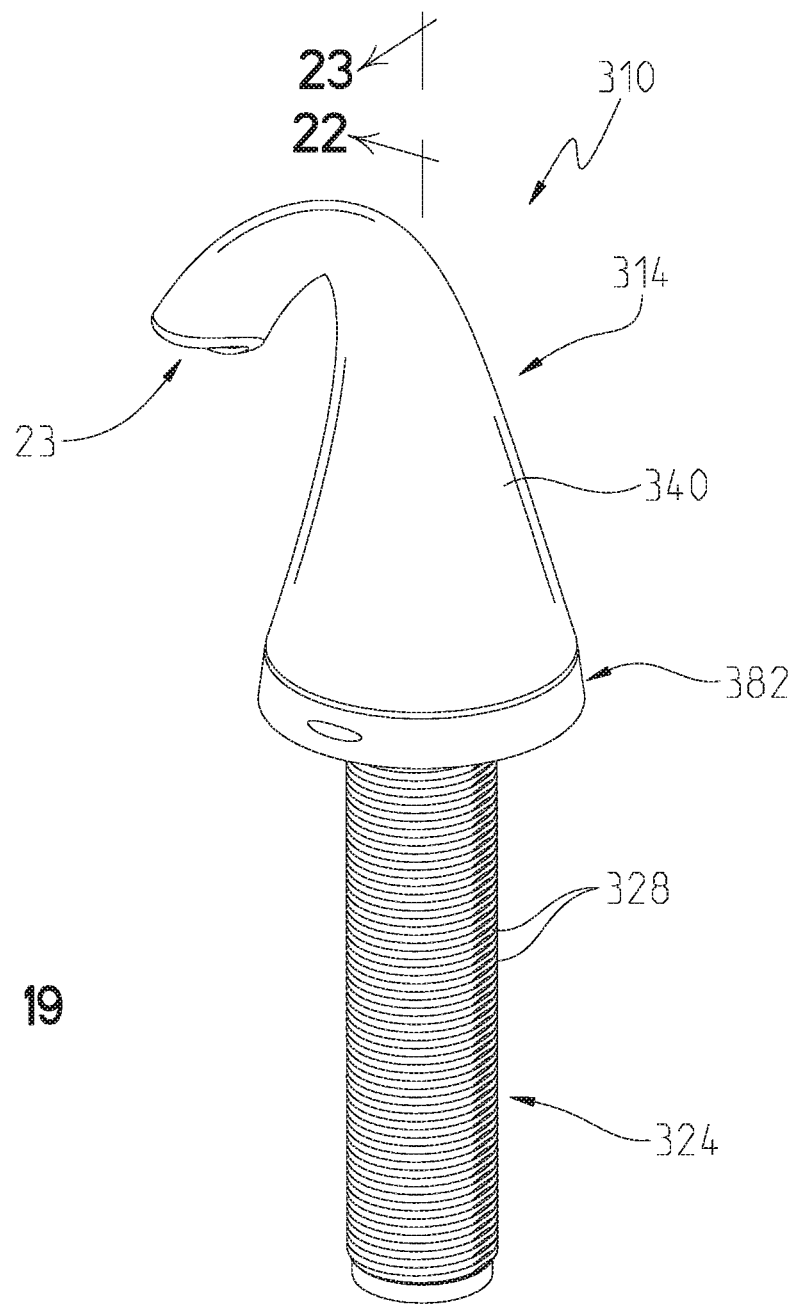
FIG. 19 is a perspective view of a dispensing head and mounting shank of another illustrative electronic soap dispenser of the present disclosure.
Figure 20:
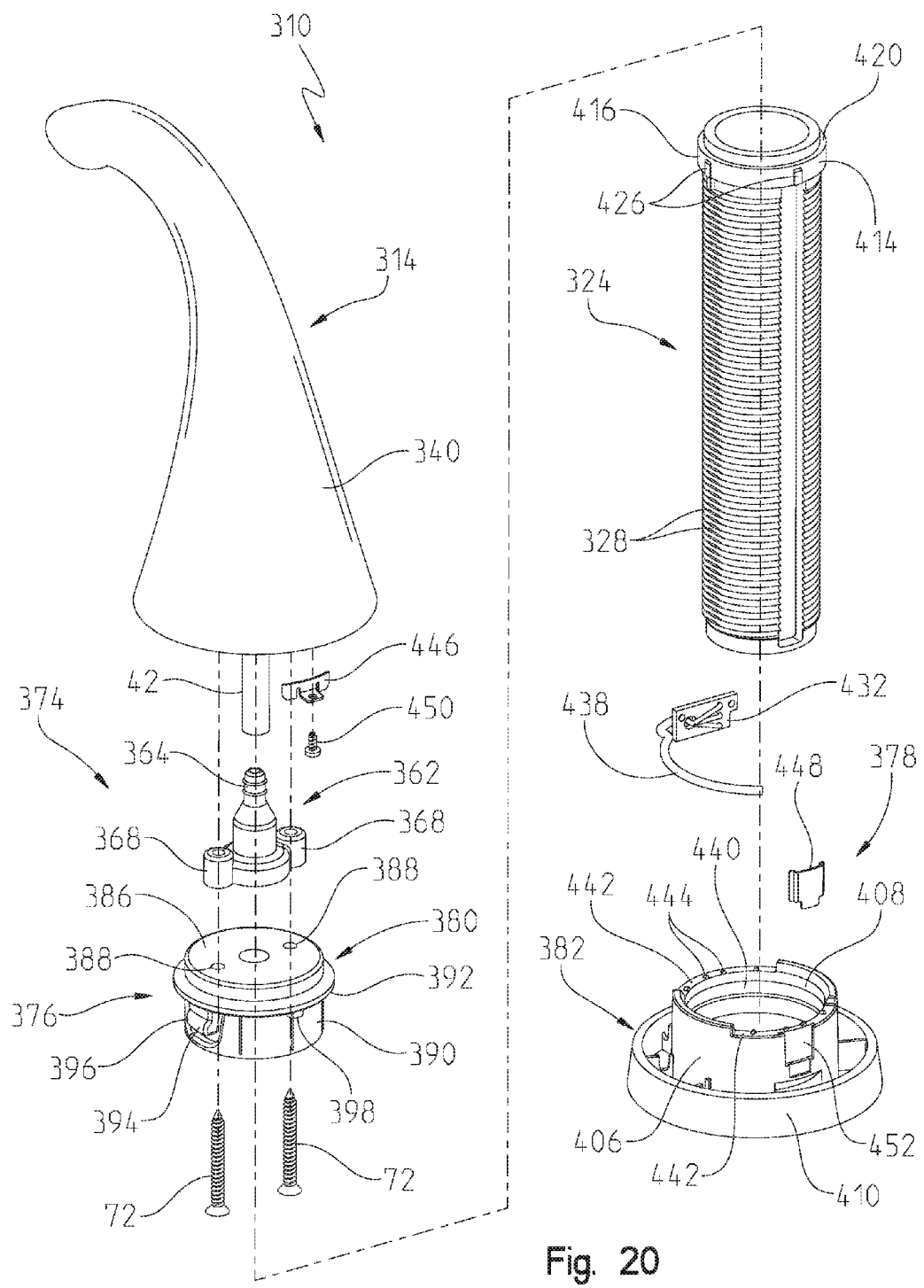
FIG. 20 is a top exploded perspective view of the dispensing head and mounting shank of FIG. 19.

FIG. 18 shows an exemplary output signal 119 from capacitive sensor 118. The controller 120 establishes a hands free threshold level 232 and a spout touch threshold level 234 as illustrated in FIG. 18. As the user's hands enter the detection area 121, a slope of the capacitive signal 119 changes gradually as illustrated at location 236 in FIG. 18. Edge portion 236 of the capacitive signal 119 illustrates the effect of the user's hands within the detection area 121 and the negative slope of capacitive signal 119 at location 238 illustrates the user's hands leaving the detection area 121. When a change in slope is detected at edge location 236 and the capacitive signal 119 rises above the hands free threshold 232 such as during portion 240 of the signal 119, the controller 120 determines that the user's hands are within the detection area 121. If the hands free mode is active or enabled, controller 120 will then provide a signal to pump assembly 20 to pump liquid soap through the outlet 23. Illustratively, the controller 120 maintains the soap flow for a slight delay time (illustratively about 2 seconds) after the capacitive signal 119 drops below the threshold level at location 238. This reduces the likelihood of pulsation if the user's hands are moved slightly or for a very short duration out of the detection area 121 and then back into the detection area 121.

The same output signal 119 from the capacitive sensor 118 may also be used to distinguish between whether the input member 110 is touched by a user. When the input member 110 coupled to the dispensing head 14 is touched, a large positive slope is generated in the capacitive signal 119 as illustrated a location 242. The capacitive signal count level exceeds the touch threshold 234 during the time of the touch which is shown by portion 246 between the positive slope 242 and the negative slope at location 244. The negative slope at location 244 as detected by the controller 120 indicates that the touch has ended. The controller 120 may also distinguish between a "tap" and a "grab" of the dispensing head 14. More particularly, the controller 120 may make such a distinction based on the amount of time between the positive and negative slopes 244 and 244 of the capacitive signal 119. A longer duration indicates a "grab", while a shorter duration indicates a "tap".

In an illustrated embodiment, hands free threshold 232 for proximity detection is set at about 30-40 counts. The spout touch detection threshold 234 is illustratively set at about 300-400 counts. In other words, the amplitude of the capacitive signal 119 from capacitive sensor 118 for the spout touch threshold 234 is about 10 times greater than the amplitude for the hands free threshold 232. In certain illustrative embodiments, the proximity or hand free threshold is factory set such that the controller 120 activates the pump assembly 20 when a user's hand is within 0.5 inches of the electrode 110.

To refill the soap reservoir 18, the dispensing head 14 is removed from the mounting shank, for example by axially pulling the spout body 40 from the mounting shank 24. The dispensing tube 42 is thereby uncoupled from the supply tube 36. Liquid soap may then be poured within the reservoir neck 33 around the supply tube 36 to replenish the reservoir 18. A funnel may be used to facilitate pouring the liquid soap into the inlet 224. After refilling the soap reservoir 18, the dispensing head 14 is replaced. More particularly, the spout body 40 is placed axially on the mounting shank 24 and then locked in position. The dispensing tube 42 is again fluidly coupled to the supply tube 36. More particularly, the upper end 46 of the supply tube 36 is received within the funnel 66 of the tube retainer 62

With reference now to FIGS. 19-23, the dispensing head 314 of a further illustrative electronic soap dispenser 310 is shown. The components below the sink deck 12 (e.g., the soap reservoir 18 and the pump assembly 20) may be substantially similar to those detailed above in connection with the electronic soap dispenser 10 of FIGS. 1-18. As such, in the following description similar components are identified with like reference numbers.

Similar to mounting shank 24 detailed above, a mounting shank 324 extends downwardly through opening 26 in the sink deck 12 and secures both the dispensing head 314 and the lower soap reservoir 18 to the sink deck 12. The mounting shank 324 includes external threads 328 that engage with internal threads 30 of mounting nut 32. The sink deck 12 is clamped between the dispensing head 314 and the mounting nut 32.

The dispensing head 314 illustratively includes a hollow spout body 340 receiving dispensing tube 42. The spout body 340 is illustratively formed from a material having at least a portion being electrically conductive and thereby defining the input member or electrode 110. In one illustrative embodiment, the spout body 340 is formed of a metal, such as a plated brass. In another illustrative embodiment, the spout body 340 is formed of a chromed acrylonitrile butadiene styrene (ABS). The dispensing tube 42 extends within a hollow passageway 343 of the spout body 340. As detailed above, lower end 44 of the dispensing tube 42 is in fluid communication with an upper end 46 of the supply tube 36, and an upper end 48 of the dispensing tube 42 defines dispensing outlet 23.

A hose or tube retainer 362 secures the lower end 44 of the dispensing tube 42 to the spout body 340. The tube retainer 362 may be substantially similar to the tube retainer 62 detailed above. More particularly, the hose retainer 362 may be formed of a polymer, such as an acetal copolymer, and illustratively includes an upper barbed fitting 364 and a tapered lower receiving chamber or funnel 366. The upper barbed fitting 364 is secured within the tube 42, while the lower receiving chamber 366 receives the upper end 46 of the supply tube 36. A pair of mounting bosses 368 include openings 370 to receive fasteners, such as screws 72, to secure the tube retainer 362 to retaining bosses 373 of the spout body 340.

A releasable coupler 374 couples the spout body 340 to the mounting shank 324 to facilitate removal of the dispensing head 314 from the sink deck 12 for refilling the reservoir 18 with liquid soap from above the sink deck 12 and/or replacing the dispensing head 314 with different styles or designs. Illustratively, the releasable coupler 374 includes a structural coupling or connector 376 between the dispensing head 314 and the mounting shank 324, and an electrical coupling or connector 378 between the dispensing head 314 and the pump assembly 20.

In one illustrative embodiment, the structural connector 376 of the releasable coupler 374 includes a spout retainer 380 coupled to the mounting shank 324 through a mounting base 382. The spout retainer 380 is secured to openings 384 formed in the retaining bosses 378 of the spout body 340 through fasteners 72. The spout retainer 380 is illustratively formed of a polymer and includes an upper wall 386 including openings 388 aligned with the openings 370 of the hose retainer 362 and the openings 384 of the spout body 340 for receipt of the fasteners 72.

A cylindrical sidewall 390 extends downwardly from the upper wall 386, and a flange 392 extends radially outwardly from the sidewall 390 proximate the upper wall 386. A pair of diametrically opposed snap fingers 394 extend outwardly from the sidewall 390 and include tabs or latches 396 (FIG. 27). Detent tabs 398 extend downwardly from the flange 392 and are positioned radially outside of the sidewall 390. A receiver 400 is positioned concentrically within the sidewall 390 and includes a frusto-conical inner surface 402 to define a funnel to assist in locating and directing the upper end 46 of the supply tube 36 toward the receiving chamber 366 of the hose retainer 362.

The mounting base 382 includes a cylindrical inner wall 406 defining a center opening 408 receiving the mounting shank 324 such that the upper end of the mounting shank 324 is captured between the spout retainer 380 and the mounting base 382. A cylindrical outer wall 410 is connected to the inner wall 406 by a lower wall 412 that rests upon upper surface 16 of the sink deck 12. The outer wall 410 defines an electrically insulating spacer between the sink deck 12 and the spout body 340.

Figure 21:
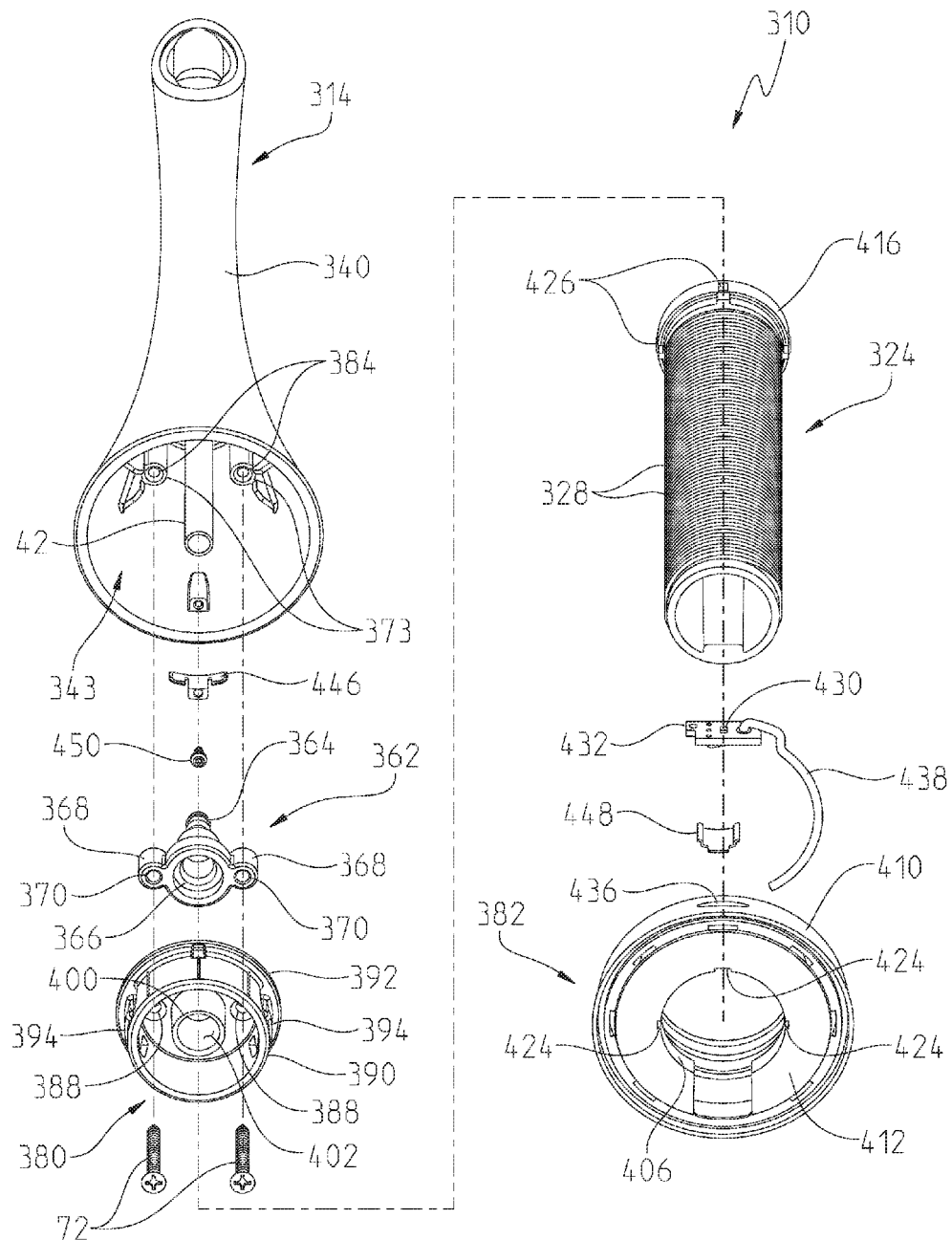
FIG. 21 is bottom exploded perspective view of the dispensing head and mounting shank of FIG. 19.
Figure 22:
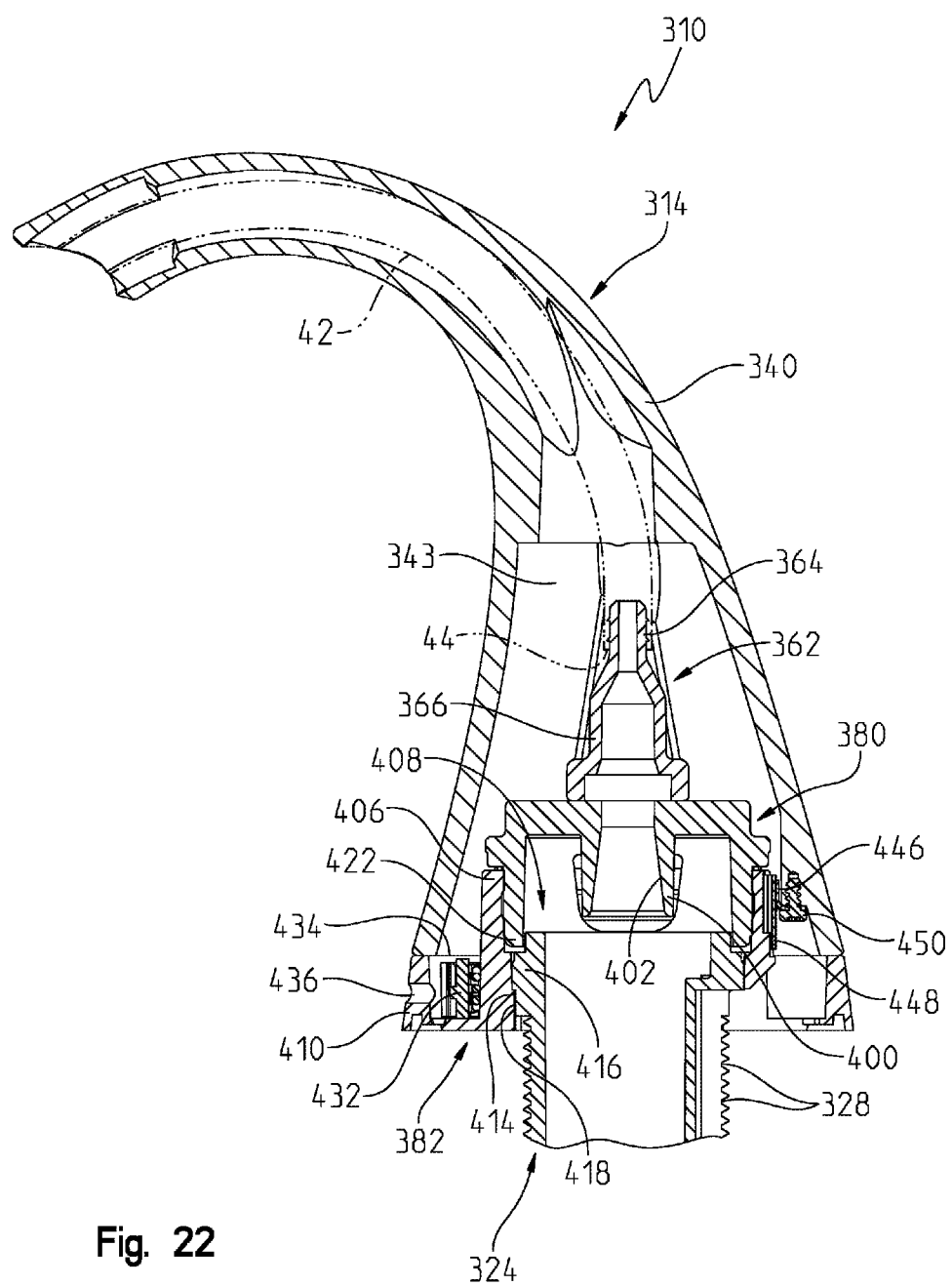
FIG. 22 is a cross-sectional view taken along line 22-22 of FIG. 19.
Figure 23:
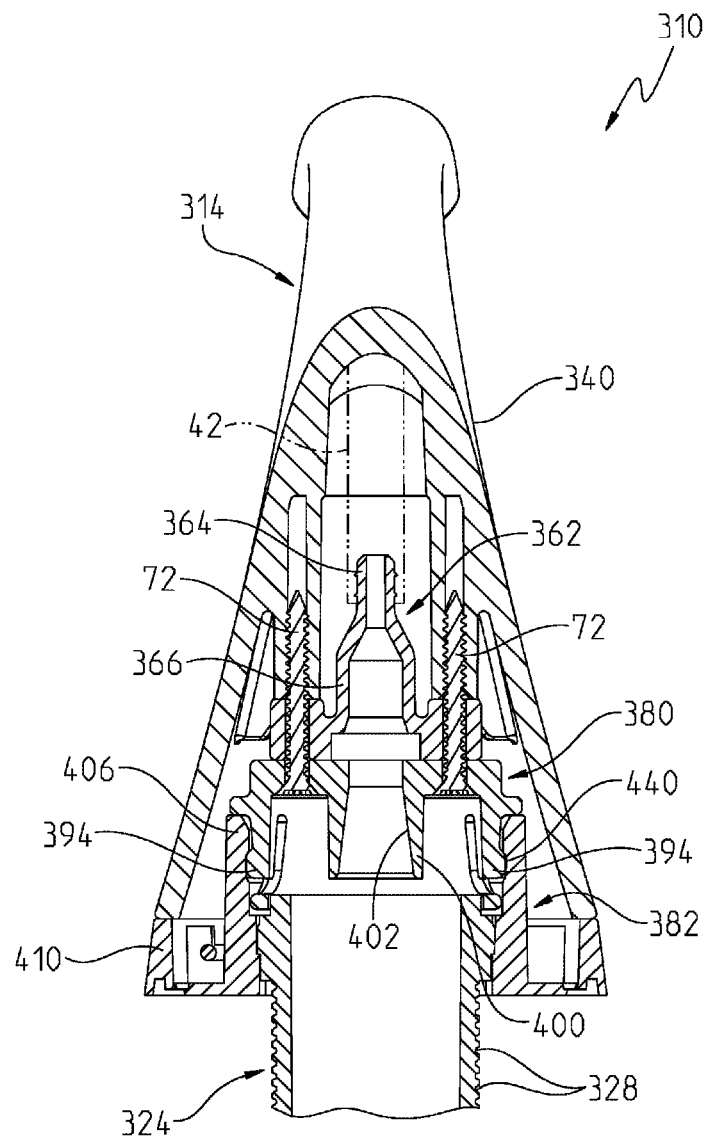
FIG. 23 is a cross-sectional view taken along line 23-23 of FIG. 19.

With reference to FIG. 22, a lower surface 414 of an upper lip 416 of the mounting shank 324 rests upon a flange 418 of the mounting base 382, while an upper surface 420 of the upper lip 416 of the mounting shank 324 faces a lower surface 422 of the spout retainer 380. As shown in FIG. 21, a plurality of recesses 424 in the mounting base 382 receive tabs 426 of the mounting shank 324 to rotationally orient and secure the mounting shank 324 relative to the mounting base 382. The mounting base 382 is illustratively formed of a non-conductive material, such as a polymer. As such, the mounting base 382 defines an electrical insulator between the spout body 340 and the sink deck 12.

A light indicator 430, such as one or more LEDs, may be coupled to a support 432, such as a printed circuit board. The support 432 is illustratively received within a cavity or slot 434 defined between the inner and outer walls 406 and 410 of the mounting base 382. The light indicator 430 is oriented to provide light visible through a lens 436. A cable or wire 438 electrically couples the light indicator 430 to the controller 120.

The latches 396 of the snap fingers 394 are received within an annular slot 440 formed within the inner wall 406 of the mounting base 382. The snap fingers 394 axially restrain the spout retainer 380 and therefore the spout body 340, while permitting rotational movement of the spout retainer 380 and the spout body 340 relative to the mounting base 382. When the spout body 340 is coupled to the mounting base 382, the detent tabs 398 of the spout retainer 380 are received within cooperating arcuate notches 442 formed in the upper end of the inner wall 406 of the mounting base 382. Protrusions 444 are supported within the notches 442 and define discrete angular positions of the spout retainer 380 and spout body 340 relative to the mounting base 382.

As noted above, the electrical connector 378 defines a releasable electrical coupling between the dispensing head 314 and the pump assembly 20 for selective electrical communication therebetween. The electrical connector 378 provides communication between the capacitive input member 110 above the sink deck 12 and electronics below the sink deck 12. This quick disconnect feature allows a user to remove the spout body 340, for example, when refilling the soap reservoir 18, without dealing with a wired connection between the mounting base 382 and the spout body 40.

The electrical connector 378 includes a first electrical contact 446 supported for movement by the dispensing head 314, and a second electrical contact 448 in selective electrical communication with the first electrical contact 446 supported by the mounting base 382. The first electrical contact 446 is illustratively formed of an electrically conductive material, such as copper or brass, and is supported within the passageway 343 of the spout body 340. The first electrical contact 446 may be secured in place through a fastener, such as a screw 450. The second electrical contact 448 is supported by the wall of the mounting base 382 and is in selective electrical communication with the first electrical contact 446 supported by the spout body 340. More particularly, the second electrical contact 448 is illustratively formed of an electrically conductive material, such as copper or brass, and is received within a recess 452 formed in the inner wall 406 of the mounting base 382.

Figure 24:
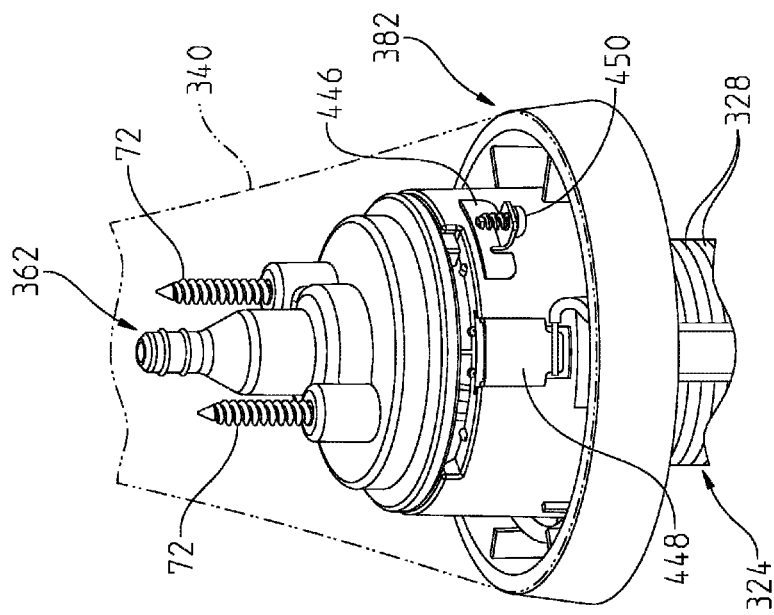
FIG. 24 is a detailed perspective view of the dispensing head of FIG. 19 with the spout body shown in phantom and rotationally located in a centered position relative to the mounting base.
Figure 25:
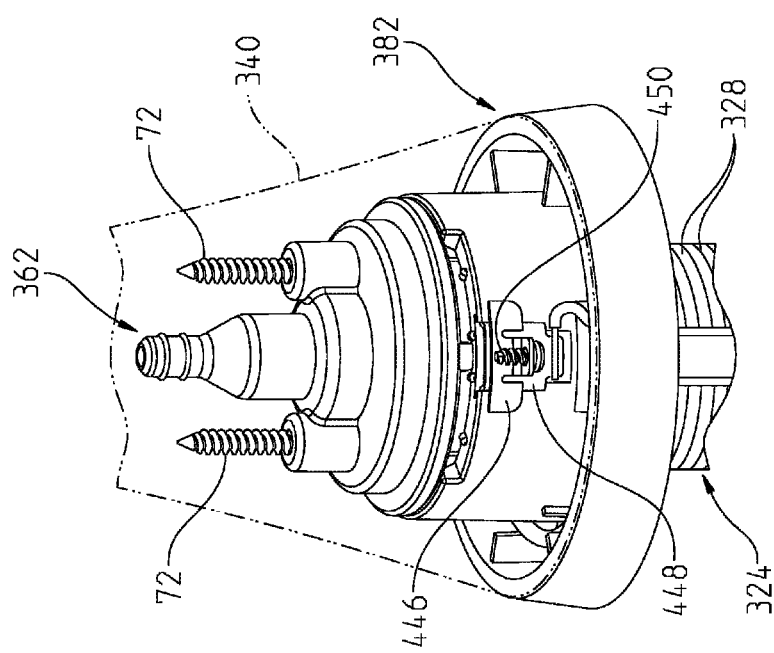
FIG. 25 is a perspective view similar to FIG. 24 with the spout body rotationally located in a counterclockwise limit position.

With reference to FIGS. 24-26, the spout body 340 may be rotated relative to the mounting base 382 to activate and deactivate the capacitive sensing input to the controller 120. A significant and/or sudden drop in the capacitive output signal 119 may provide an indication to the controller 120 that the spout body 340 has been removed, e.g., for refilling the reservoir 18 with soap.

In the position of FIG. 24, the spout body 340 is in a centered or home position where the contacts 446 and 448 are angularly aligned and thereby in electrical communication. In the position of FIG. 25, the spout body 340 has been rotated counter-clockwise by more than a predetermined amount (illustratively more than −28 degrees) to an off or deactivated position. Similarly, the spout body 340 may be rotated clockwise by more than the predetermined amount (illustratively more than +28 degrees) to an off or deactivated position. In the off positions, the contacts 446 and 448 are not angularly aligned and thereby not in electrical communication with each other. The spout body 340 may also be rotated clockwise or counterclockwise by a predetermined amount (illustratively by +/−28 degrees) to an active intermediate position where the contacts 446 and 448 are still angularly overlapping and thereby in electrical communication. FIG. 26 illustrates the spout body 340 rotated clockwise to the +28 degree position. As noted above, the mounting base wall includes arcuate notches to receive tabs 398 from the spout retainer 380. The tabs 398 and protrusions 444 act as an indexing member to define different defined angular positions of the spout body 340 relative to the mounting base 382.

In operation, the electronic soap dispenser 10 may be toggled between on and off conditions by rotating the spout body 340 about the mounting base 382. In the manner detailed above, the controller 120 may distinguish between a proximity input and a touch or contact input. The controller 120 may also distinguish between a touch input and a grasp or grab input. A proximity input may be distinguished from a contact input (touch or grab) based upon the intensity of the input signal from the capacitive sensor 118. A contact input may be distinguished between a touch (or tap) and a grab based upon the duration of the contact input signal from the capacitive sensor 118.

Illustratively, upon detecting a proximity output signal from the capacitive sensor 118, the controller 120 will cause the pump assembly 20 to dispense soap in a predetermined quantity. Upon detecting a touch (or tap) output signal from the capacitive sensor 118, the controller 120 will cause the pump assembly 20 to dispense soap continuously for a predetermined time. As such, the quantity of soap dispensed may be different depending upon proximity or touch activation. Alternatively, the quantity of soap dispensed may be the same for both proximity and touch activation. As further detailed herein, this predetermined quantity may be set by a user in certain embodiments.

A timer within the controller 120 may limit the time for dispensing soap, for example should a sensor malfunction or misuse occur. In another illustrative embodiment, the controller 120 may dispense a quantity of soap for each touch (or tap). For example, the controller 120 may dispense a single shot of soap in response to a single tap, two shots of soap in response to two taps, etc. Upon detecting a grab the controller 120 may cause the pump assembly 20 to remain inactive, such that no soap will be dispensed. As such, a user may grab and rotate the spout body 340 without dispensing soap. For example, the user may rotate the spout body 340 between on and off positions, or may remove the spout body 340 from the sink deck 12 without dispensing soap.

The dispensing head 314 may be removed from the sink deck 12 by pulling the spout body 340 upwardly away from the mounting base 382. The snap fingers 394 of the spout retainer 380 are thereby released from the slot 440 of the mounting base 382. The soap reservoir 18 may then be refilled in a manner similar to that detailed above with soap dispenser 10.

Figure 28:
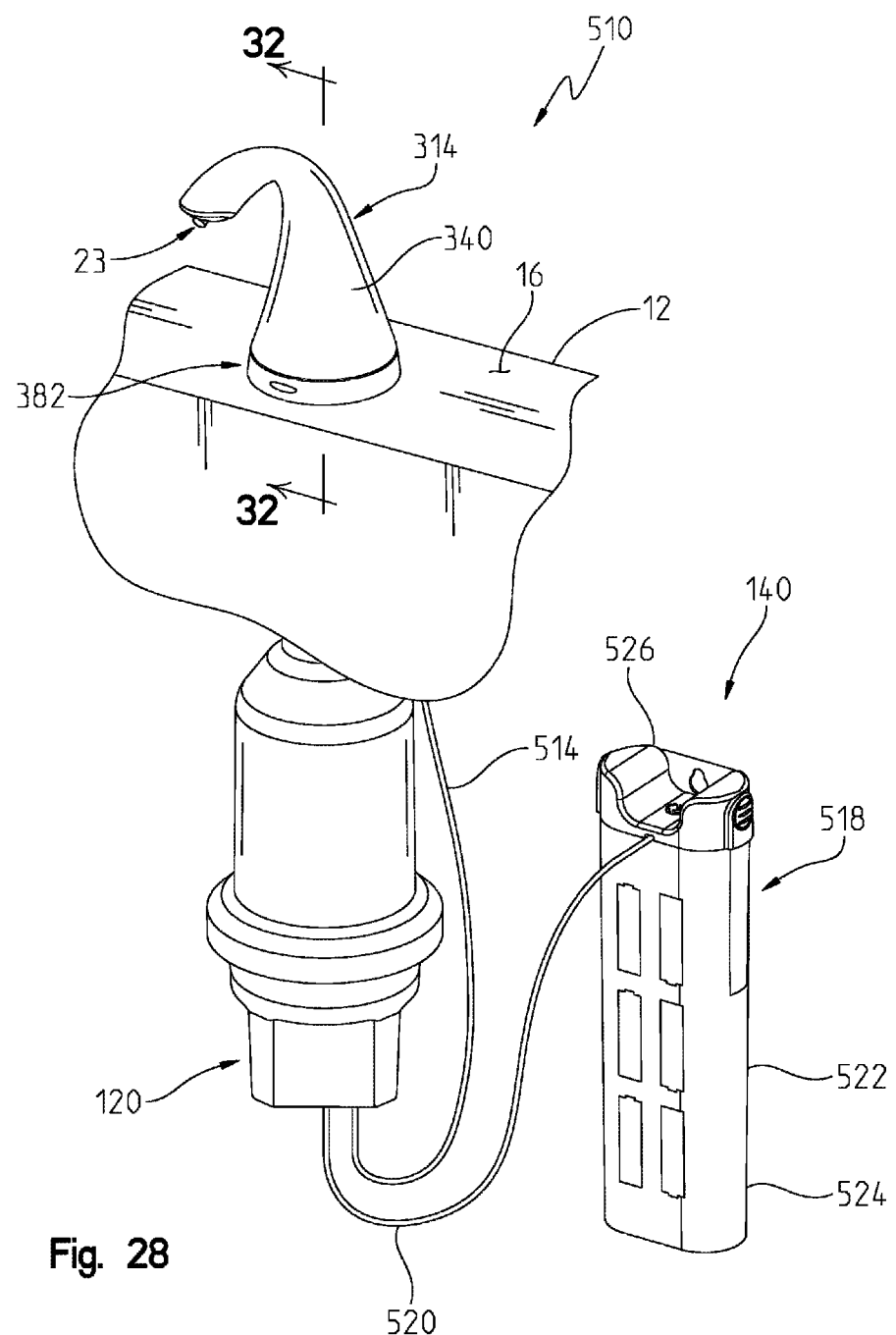
FIG. 28 is a perspective view of an illustrative electronic soap dispenser of the present disclosure coupled to a mounting deck in a stand-alone configuration.
Figure 29:
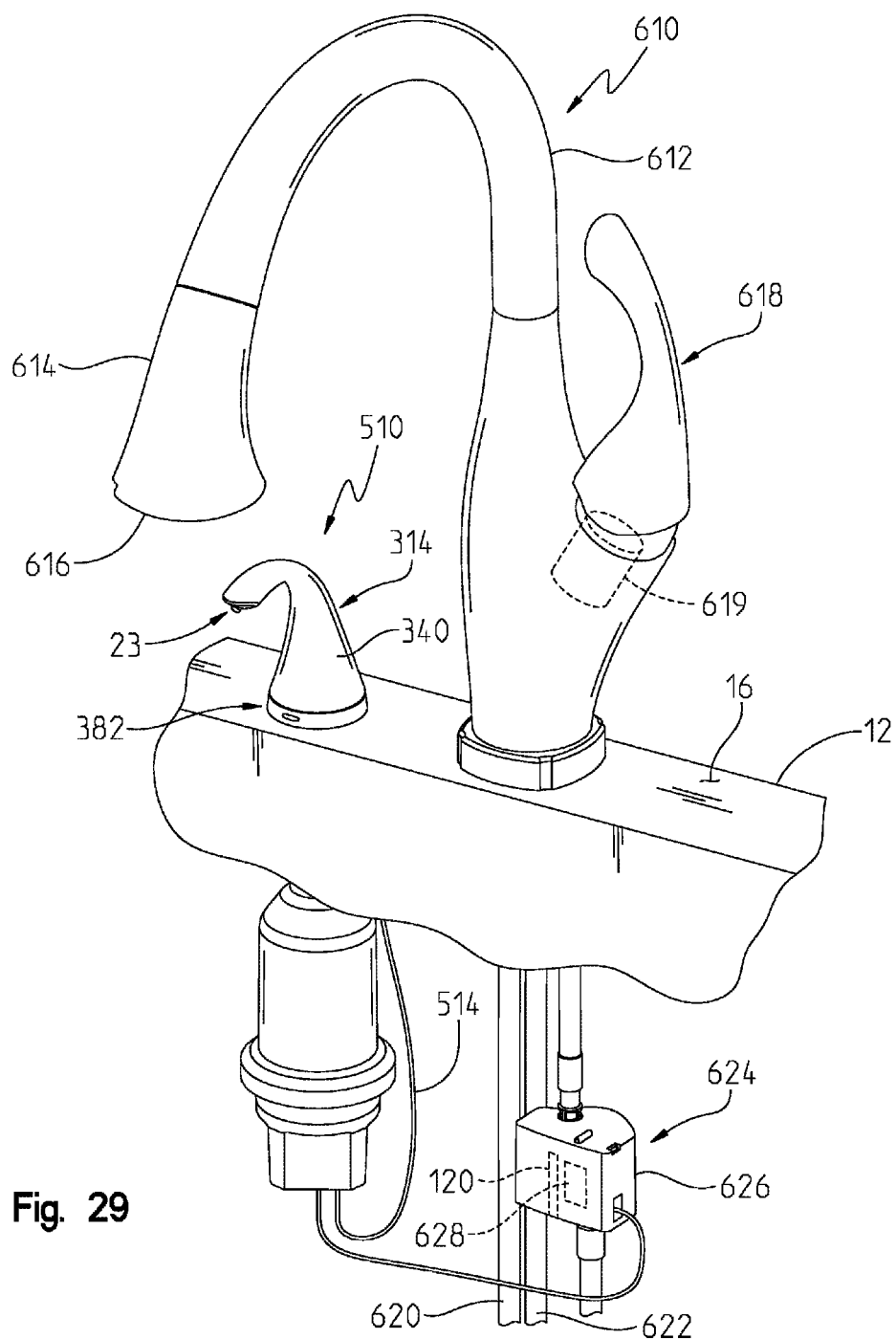
FIG. 29 is a perspective view of an illustrative electronic soap dispenser of the present disclosure coupled to a mounting deck in an integrated configuration with an electronic faucet.

An illustrative electronic soap dispenser 510 is shown coupled to sink deck 12 in a stand-alone configuration in FIG. 28, while the electronic soap dispenser 510 is shown coupled to sink deck 12 in an integrated configuration in FIG. 29. The electronic soap dispenser 510 is substantially similar to the illustrative soap dispensers 10 and 310 of FIGS. 1-27 as detailed above. As such, in the following description similar components are identified with like reference numbers.

In the stand-alone configuration of FIG. 28, the electronic soap dispenser 510 may be operated independently from other devices. More particularly, the electronic soap dispenser 510 includes its own controller 120 and power supply 140. In the illustrative embodiment, the controller 120 is supported on a printed circuit board (PCB) 512 which is electrically coupled to motor 176. An electrical cable 514 illustratively couples the dispensing head 314 to the controller 120. The electrical cable 514 illustratively includes an electrical connector, such as a mini-USB plug 516. The spout body 340 is illustratively formed from an electrically conductive material, thereby defining the input member or electrode 110.

In the illustrative stand-alone configuration of soap dispenser 510 (FIG. 28), the power supply 140 comprises a battery pack 518. The battery pack 518 is coupled to the motor 176 through an electrical cable 520. The battery pack 518 illustratively includes a battery box 522 having a lower housing or holder 524 and a cover 526. The lower housing 524 defines an internal chamber sized to receive batteries (not shown), illustratively two 3 cell groups of AA-cell batteries (6 batteries total).

In the integrated configuration of FIG. 29, the electronic soap dispenser 510 is operably coupled, or tethered, to another electronic device, illustratively an electronic faucet 610. The electronic faucet 610 may include a spout 612 supporting a sprayhead 614 defining a mixed water outlet 616. A handle 618 is connected to a manual valve 619, which is fluidly coupled to hot and cold water supply lines 620 and 622 to control the flow rate and the temperature of water supplied to the mixed water outlet 616.

A control unit 624 may include a housing 626 supporting an electrically actuated valve 628 operated by controller 120. In the illustrative embodiment, the controller 120 is supported by a printed circuit board (PCB) in electrical communication with the electronic faucet 610. The controller 120 is configured to open and close the electrically operably valve 628 in response to an input sensor of the faucet 610. The input sensor may be an infra-red (IR) sensor and/or a capacitive sensor.

Each of the illustrative soap dispensers 10, 310, 510 detailed herein may be configured to operate in either the stand-alone mode (without a connection to an external controller), or in the integrated mode (with a connection to an external controller, such as electronic faucet 610).

Figure 30:
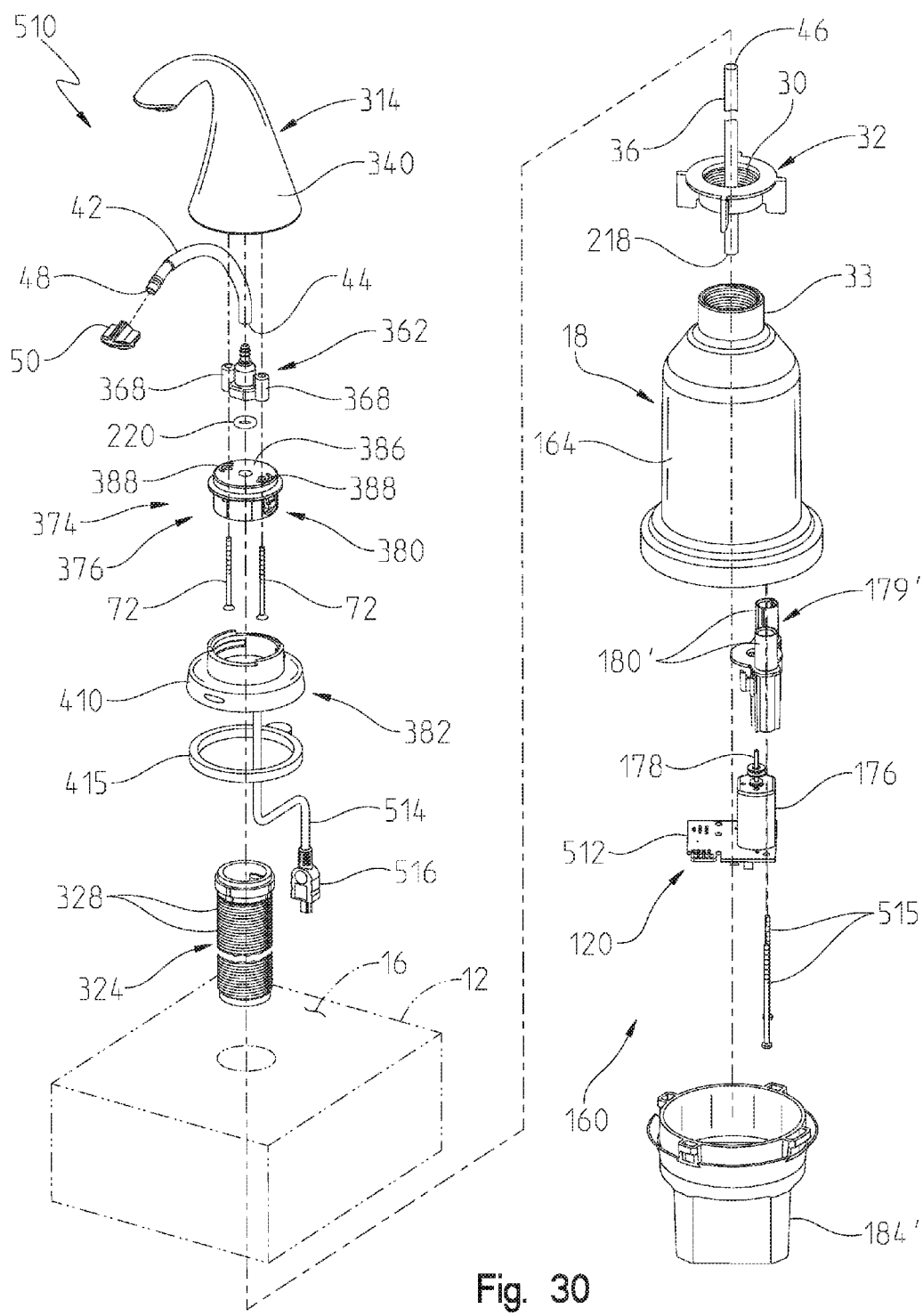
FIG. 30 is a top exploded perspective view of the electronic soap dispenser of FIG. 28.
Figure 31:
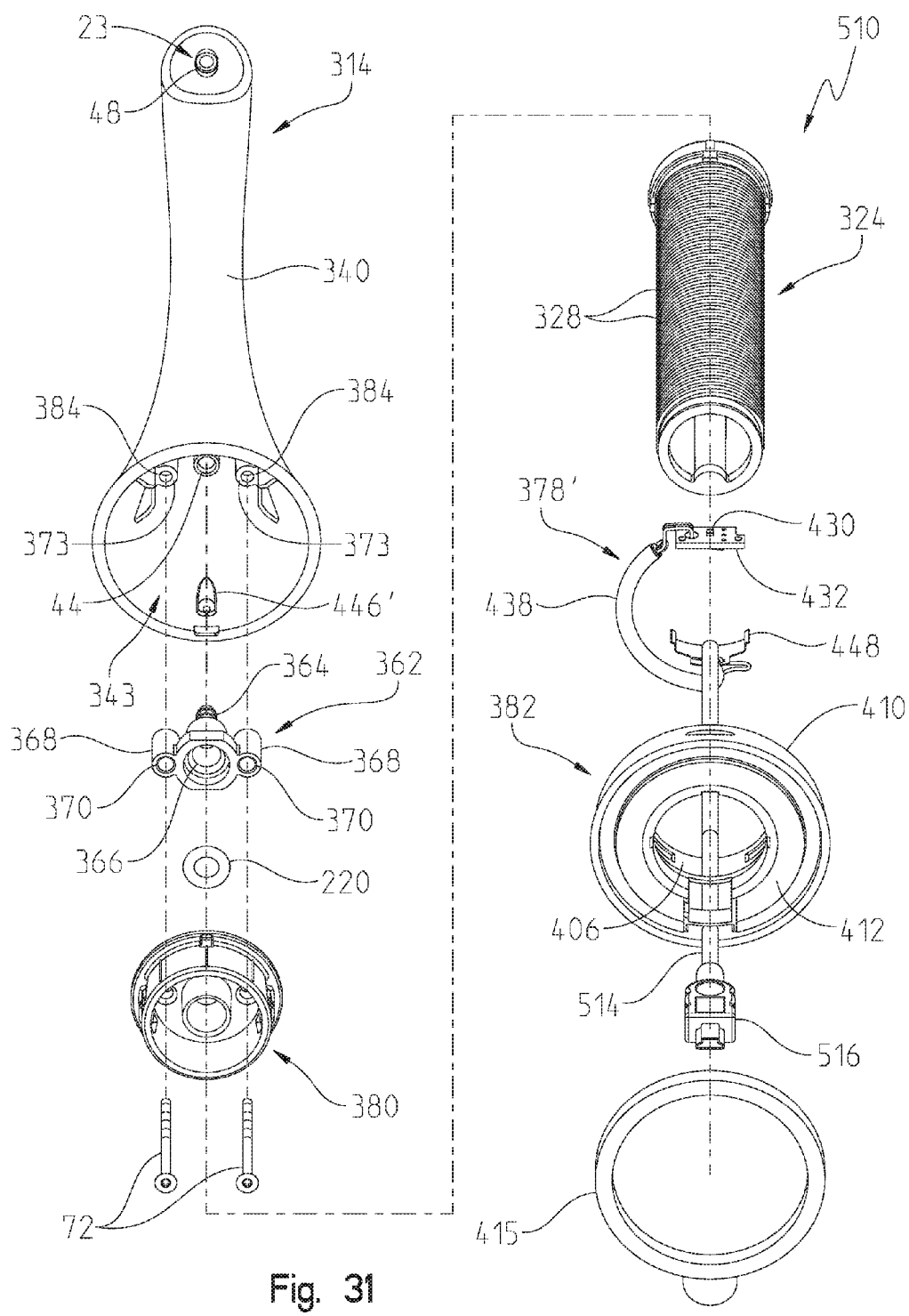
FIG. 31 is a partial bottom exploded perspective view of the dispensing head and mounting shank of FIG. 28.
Figure 32:
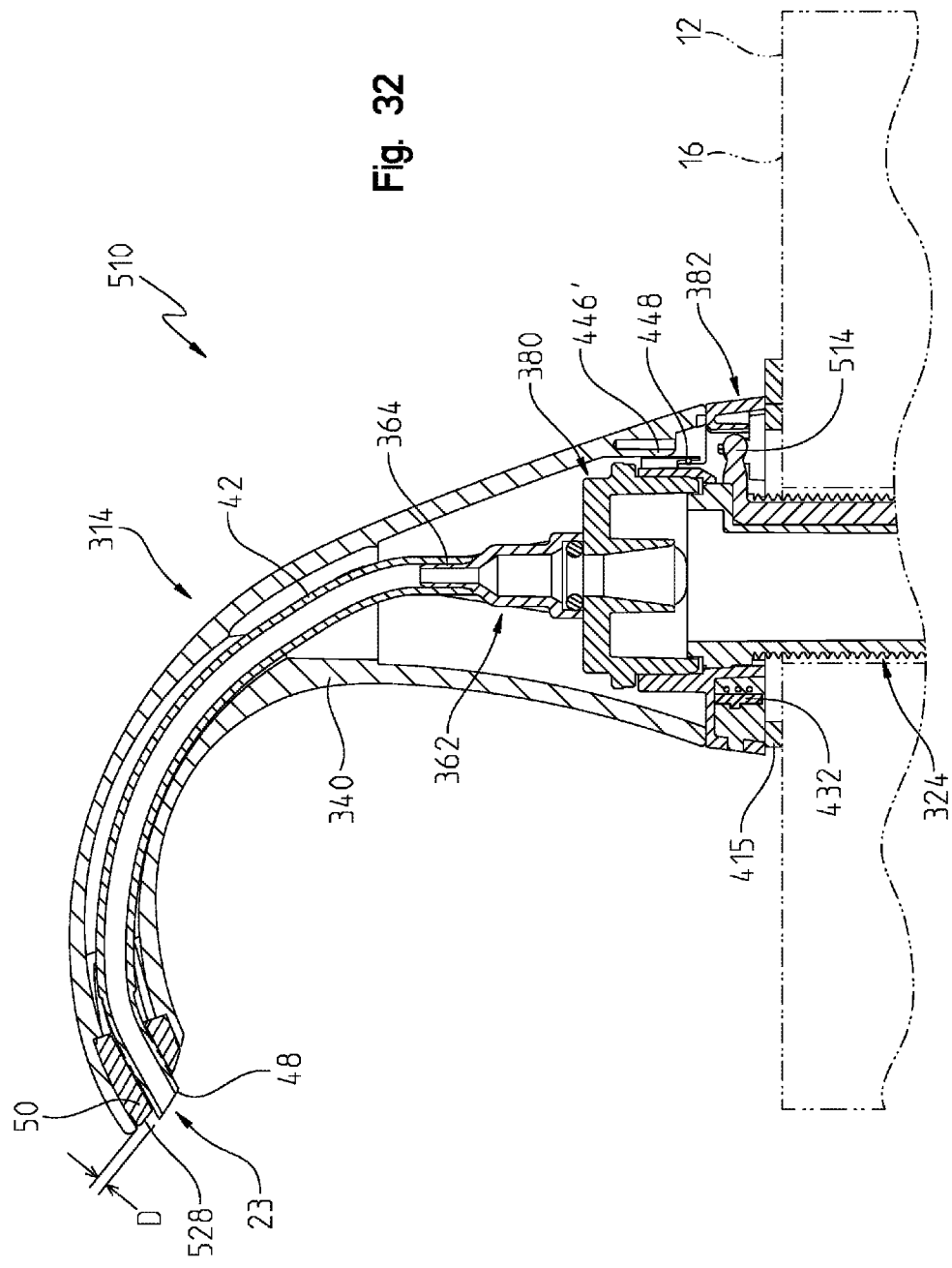
FIG. 32 is a cross-sectional view taken along line 32-32 of FIG. 28.

With reference now to FIGS. 30-32, the dispensing head 314 of illustrative electronic soap dispenser 510 is shown in greater detail. The components below the sink deck 12 (e.g., the soap reservoir 18 and the pump assembly 20) may be substantially similar to those detailed above in connection with the electronic soap dispenser 10 of FIGS. 1-18 and the electronic soap dispenser 310 of FIGS. 19-27. One distinction however, is that the motor 176 is directly coupled to the printed circuit board (PCB) 512. More particularly, electrical connections of the motor 176 are soldered directly to electrical contacts on the PCB 512 (FIG. 30). This eliminates the need for a separate electrical cable between the motor 176 and the PCB 512, thereby reducing associated component and assembly costs.

As further detailed above, mounting shank 324 extends downwardly through opening 26 in the sink deck 12 and secures both the dispensing head 314 and the lower soap reservoir 18 to the sink deck 12. The mounting shank 324 includes external threads 328 that engage with internal threads 30 of mounting nut 32. The sink deck 12 is clamped between the dispensing head 314 and the mounting nut 32.

The dispensing head 314 illustratively includes hollow spout body 340 receiving dispensing tube 42. The spout body 340 is illustratively formed from a material having at least a portion being electrically conductive and thereby defining the input member or electrode 110. As detailed above, lower end 44 of the dispensing tube 42 is in fluid communication with an upper end 46 of the supply tube 36, and an upper end 48 of the dispensing tube 42 defines dispensing outlet 23.

Tip or nozzle 50 secures the outlet 23 defined by the upper end 48 of the dispensing tube 42 to the dispensing head 314. As shown in FIG. 32, the outlet 23 of the dispensing tube 42 extends a distance D from the outer face 528 of the dispensing head 314 to prevent dripping of soap down the outer surface thereof. In the illustrative embodiment, the distance D is at least 0.063 inches.

Tube retainer 362 secures the lower end 44 of the dispensing tube 42 to the spout body 340. Mounting bosses 368 include openings 370 to receive fasteners, such as screws 72, to secure the tube retainer 362 to retaining bosses 373 of the spout body 340.

Releasable coupler 374 couples the spout body 340 to the mounting shank 324 to facilitate removal of the dispensing head 314 from the sink deck 12 for refilling the reservoir 18 with liquid soap from above the sink deck 12 and/or replacing the dispensing head 314 with different styles or designs. Illustratively, the releasable coupler 374 includes structural coupling or connector 376 between the dispensing head 314 and the mounting shank 324, and an electrical coupling or connector 378' between the dispensing head 314 and the pump assembly 20.

In one illustrative embodiment, the structural connector 376 of the releasable coupler 374 includes spout retainer 380 coupled to the mounting shank 324 through mounting base 382. The spout retainer 380 is secured to openings 384 formed in the retaining bosses 373 of the spout body 340 through fasteners 72. The spout retainer 380 includes upper wall 386 having openings 388 aligned with the openings 370 of the hose retainer 362 and the openings 384 of the spout body 340 for receipt of the fasteners 72.

The mounting base 382 includes cylindrical inner wall 406 defining center opening 408 receiving the mounting shank 324 such that the upper end of the mounting shank 324 is captured between the spout retainer 380 and the mounting base 382. Cylindrical outer wall 410 is connected to the inner wall 406 by lower wall 412 that rests upon upper surface 16 of the sink deck 12. The outer wall 410 defines an electrically insulating spacer between the sink deck 12 and the spout body 340.

As noted above, the electrical connector 378' defines a releasable electrical coupling between the dispensing head 314 and the pump assembly 20 for selective electrical communication therebetween. The electrical connector 378 provides communication between the capacitive input member 110 above the sink deck 12 and electronics (e.g., PCB 512) below the sink deck 12. As noted above, this quick disconnect feature allows a user to remove the spout body 340, for example, when refilling the soap reservoir 18, without dealing with a wired connection between the mounting base 382 and the spout body 40.

The electrical connector 378 includes a first electrical contact 446' supported for movement by the dispensing head 314, and second electrical contact 448 in selective electrical communication with the first electrical contact 446' supported by the mounting base 382. The first electrical contact 446' is illustratively defined by a protrusion or boss integral with the spout body 340 and extending within the passageway 343. The second electrical contact 448 is supported by the wall of the mounting base 382 and is in selective electrical communication with the first electrical contact 446' defined by the boss of the spout body 340. More particularly, the second electrical contact 448 is illustratively formed of an electrically conductive material, such as copper or brass, and is received within recess 452 formed in the inner wall 406 of the mounting base 382.

Figure 33:
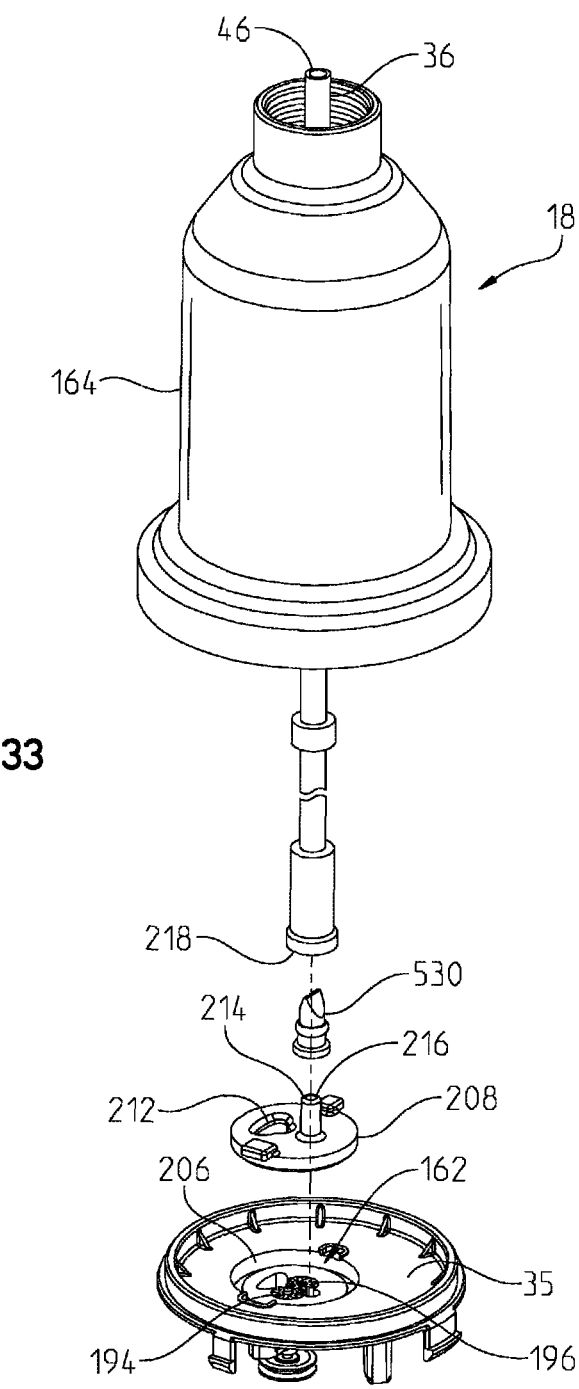
FIG. 33 is a partial top exploded perspective view of the lower soap reservoir and pump assembly of FIG. 28.

With reference to FIGS. 30 and 33, the pump assembly 20 is supported by the soap reservoir 18 and illustratively includes a drive mechanism 160 operably coupled to a pump device 162. The bottom wall 35 of the reservoir 18 supports the pump assembly 20 and is secured to the side wall 164.

The drive mechanism 160 illustratively includes electric motor 176 having rotatable drive shaft 178 and operably coupled to the controller 120. The electric motor 176 is illustratively supported below the bottom wall 35 by motor mount 179'. The motor mount 179' includes a pair of receiving bosses 180' receiving a pair of posts 182 extending downwardly from the bottom wall 35 (FIG. 8). The drive mechanism 160 is retained within a motor cover 184' which, in turn, is secured to the bottom wall 35. The motor cover 184' is illustratively formed of a polymer and protects the drive mechanism 160 from debris.

With reference to FIG. 33, gears 194 and 196 are received within a recess 206 formed in the bottom wall 35. A gear cover 208 is positioned above the gears 194 and 196 and is secured to the bottom wall 35 by a plurality of fasteners, such as screws 210. The gear cover 208 includes an inlet port 212 and an outlet port 214 on opposite sides of where the gear teeth 202 and 204 mesh. The outlet port 214 is defined by an upwardly extending nipple 216 received within a check valve 530. The check valve 530 may be received within a lower end 44 of the dispensing tube 42. The check valve 530 may be of conventional design similar to check valve 56, as detailed above.

The supply tube 36 extends upwardly through the reservoir 18 and into the dispensing head 14. More particularly, the lower end 218 of the supply tube 36 is fluidly coupled to the outlet port 214 of the gear cover 208, while the upper end 46 of the supply tube 36 is received within the receiving chamber 66 of the tube retainer 62. As such, the dispensing tube 36 extends axially the full length of the soap reservoir 18 from proximate the bottom wall 35 through the sink deck 12 and into the dispensing head 14.

Figure 34A:
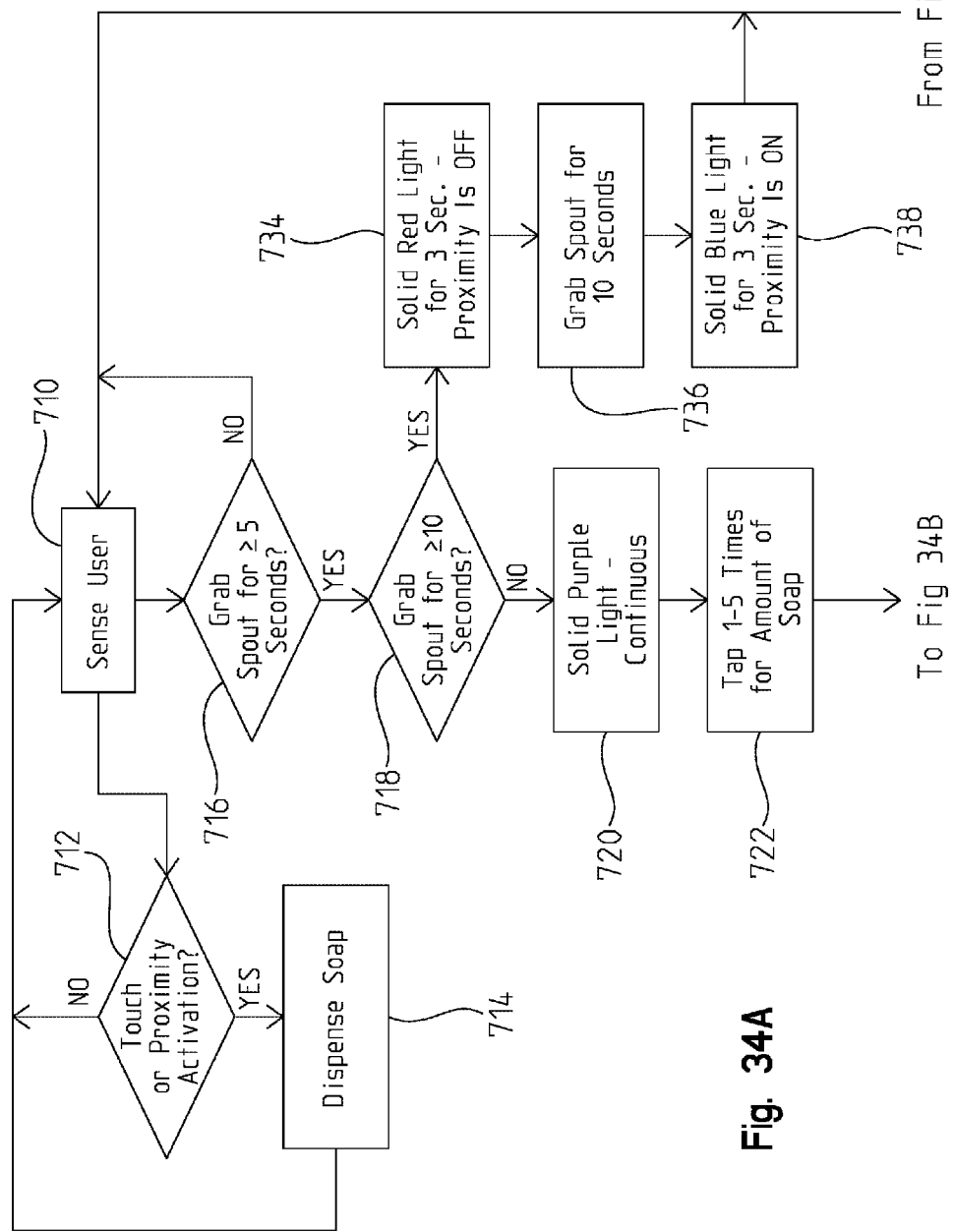
FIGS. 34A and 34B are flow charts of an illustrative method of operation of the electronic soap dispenser of FIG. 28.
Figure 34B:
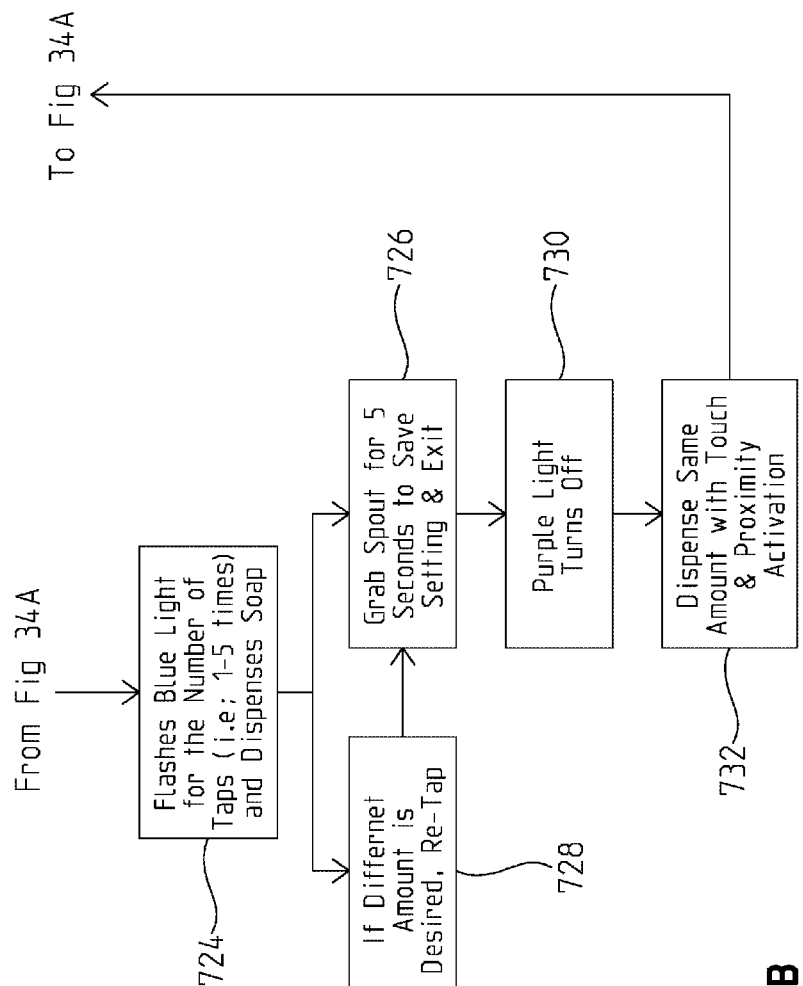

An illustrative method of operation of electronic soap dispenser 510 is shown in FIGS. 34A and 34B. Beginning at block 710, the capacitive sensor 118 detects the presence of a user. More particularly, the capacitive sensor 118 detects proximity to, or touching of, the dispensing head 314 by a user. If a touch or proximity input is detected at block 712, then liquid soap is dispensed at a predetermined quantity at block 714. If no proximity or touching is detected by the capacitive sensor 118 at block 712, then the process returns to sensing block 710.

If a grasp or grab is detected by the capacitive sensor 118, the method continues to decision block 716. At decision block 716, the controller 120 determines if the grab lasts at least 5 seconds. If the grab lasts less than 5 seconds, then the method returns to block 710. If the grab lasts at least 5 seconds, then the method proceeds to decision block 718.

At block 718, the controller 120 determines if the grab lasts at least 10 seconds. If the grab lasts less than 10 seconds (but at least 5 seconds as determined at block 716), then the method proceeds to block 720 where the light indicator 430 displays a continuous purple light. At block 722, a subroutine within the controller 120 allows the user to set the amount of soap dispensed per activation or shot (i.e., set dispensing duration). More particularly, each tap of the dispensing head 314 by the user will set the duration of soap dispensed per subsequent activation.

In an illustrative embodiment, the soap dispensing duration may be set per the following table:

| Number of Taps | Set Dispensing Duration |
| --- | --- |
| 1 | 300 milliseconds |
| 2 | 600 milliseconds |
| 3 | 1 second |
| 4 | 1.5 seconds |
| 5 | 2 seconds |

The controller 120 is illustratively set at the factory to dispense liquid soap at the duration equivalent to 3 taps, in the illustrative embodiment being 1 second. So to reduce the amount of soap delivered per activation, the user taps the dispensing head 314 one or two times once in the program mode. To increase the amount delivered, the user taps the dispensing head 314 four or five times once in the program mode. While the amount of soap dispensed per activation is illustratively varied by setting different dispensing durations in the manner detailed above, alternatively the speed of the motor 176 may be varied to increase or decrease the amount of soap dispensed.

At block 722, the controller 120 causes the light indicator 430 to flash a blue light equal to the number of taps, thereby indicating the set dispensing duration. The controller 120 then causes the pump assembly 20 to dispense soap for the set dispensing duration. If the setting is correct, at block 726 the user grabs the dispensing head 314 for at least 5 seconds to save the setting and exit the subroutine. If a different dispensing duration is desired, then the user again taps the dispensing head 314 to the desired setting at block 728. At block 730, the controller 120 deactivates the light indicator 430. The method continues to block 732, where the setting is stored by the controller 120 such that the same amount of soap is dispensed (i.e., set dispensing duration) with both touch and proximity activation. The method then returns to block 710.

Returning to decision block 718, if the controller 120 determines that the grab lasts at least 10 seconds, then the method proceeds to block 734 where the light indicator 430 displays a continuous or solid red light for 3 seconds. At block 734, a subroutine within the controller 120 allows the user to activate and deactivate proximity sensing. More particularly, at block 734, proximity sensing is deactivated. If the user wishes to reactivate proximity sensing, then at block 736 the user grabs the dispensing head 314 for at least 10 seconds. The method then continues to block 738 where the controller 120 causes the light indicator 430 to display a continuous or solid blue light for 3 seconds and the proximity sensing is again activated. The method then returns to block 710. As detailed herein, proximity sensing allows a user to dispense liquid soap without touching the dispensing head 314 if the user places his or her hand within 0.5 inches anywhere near the dispensing head 314.

Although the invention has been described in detail with reference to certain preferred embodiments, variations and modifications exist within the spirit and scope of the invention as described and defined in the following claims.

The invention claimed is:

1. An electronic soap dispenser comprising:
 a dispensing head configured to be supported above a mounting deck and including an outlet;
 a lower reservoir operably coupled to the dispensing head and configured to be supported below the mounting deck;
 a pump assembly operably coupled to the lower reservoir, the pump assembly configured to be supported below the mounting deck and to pump liquid soap from the lower reservoir to the outlet of the dispensing head;
 a capacitive sensor operably coupled to the dispensing head; and
 a controller in electrical communication with the capacitive sensor, the controller configured to receive an output signal from the capacitive sensor and to activate the pump assembly to dispense a preset amount of soap in response to the output signal, wherein the preset amount of soap to be dispensed is configured to be adjusted by a user touching the dispensing head.

2. The electronic soap dispenser of claim 1, wherein the controller is configured to activate the pump assembly for a preset dispensing duration in response to the output signal, wherein the preset dispensing duration is configured to be adjusted by a user touching the dispensing head in a programming mode.

3. The electronic soap dispenser of claim 1, wherein the dispensing head includes an electrode electrically coupled to the capacitive sensor.

4. The electronic soap dispenser of claim 3, wherein the electrode comprises an electrically conductive sensing plate.

5. The electronic soap dispenser of claim 3, wherein the electrode comprises an electrically conductive spout body.

6. The electronic soap dispenser of claim 1, wherein the dispensing head includes a spout body removable from the lower reservoir which remains coupled to the mounting deck.

7. The electronic soap dispenser of claim 6, further comprising an electrical connector including a first electrical contact supported for movement with the dispensing head, and a second electrical contact supported on the mounting deck and in selective electrical communication with the first electrical contact.

8. The electronic soap dispenser of claim 7, wherein the first electrical contact comprises one of an electrically conductive tab and an electrically conductive arcuate strip, and the second electrical contact comprises the other of an electrically conductive arcuate strip and an electrically conductive tab, the first and second electrical contacts configured to maintain electrical communication as the spout body is rotated relative to the mounting deck.

9. The electronic soap dispenser of claim 8, wherein the spout body is rotatable relative to the mounting deck from an on position where the first and second electrical contacts are in electrical communication to an off position where the first and second electrical contacts are not in electrical communication.

10. The electronic soap dispenser of claim 1, wherein the pump assembly operates in different dispensing modes based upon whether the controller receives a proximity output signal or a touch output signal from the capacitive sensor.

11. The electronic soap dispenser of claim 10, wherein the controller distinguishes between the proximity output signal and the touch output signal based upon an amplitude of the output signal from the capacitive sensor.

12. The electronic soap dispenser of claim 1, wherein the lower reservoir includes a bottom wall and an open upper neck, the pump assembly is supported by the bottom wall of the lower reservoir, and a supply tube extends upwardly through the lower reservoir from the pump assembly to an upper neck of the lower reservoir.

13. The electronic soap dispenser of claim 12, further comprising a dispensing tube extending within the dispensing head and including opposing lower and upper ends, the upper end defining the outlet, and a tube retainer securing the lower end of the dispensing tube to the dispensing head, the tube retainer including a downwardly facing funnel portion to receive an upper end of the supply tube.

14. The electronic soap dispenser of claim 1, further comprising an electrical insulator positioned between the dispensing head and the mounting deck.

15. The electronic soap dispenser of claim 1, wherein the number of successive user taps on the dispensing head sets the preset amount of soap to be dispensed.

16. An electronic soap dispenser comprising:
 a dispensing head configured to be supported above a mounting deck and including an outlet;
 a lower reservoir operably coupled to the dispensing head and configured to be supported below the mounting deck;
 a pump assembly operably coupled to the lower reservoir, the pump assembly configured to be supported below the mounting deck and to pump liquid soap from the lower reservoir to the outlet of the dispensing head;
 a capacitive sensor operably coupled to the dispensing head; and
 a controller in electrical communication with the capacitive sensor, the controller in a touch mode being configured to receive a touch output signal from the capacitive sensor when a user touches the dispensing head to activate the pump assembly in response to the touch output signal, and the controller in a hands free mode is configured to receive a proximity output signal from the capacitive sensor when a user is positioned in a detection area near the dispensing head, wherein a user may selectively enable and disable the hands free mode.

17. The electronic soap dispenser of claim 16, wherein the user may selectively enable and disable the hands free mode by touching the dispensing head for at least a predetermined time.

18. The electronic soap dispenser of claim 17, wherein the predetermined time is at least 10 seconds.

19. The electronic dispenser of claim 16, wherein the pump assembly operates in different dispensing modes based upon whether the controller receives a proximity output signal or a touch output signal from the capacitive sensor.

20. The electronic soap dispenser of claim 19, wherein the controller distinguishes between the proximity output signal and the touch output signal based upon an amplitude of the output signal from the capacitive sensor.

21. An electronic soap dispenser comprising:
a dispensing head configured to be supported above a mounting deck, the dispensing head including a spout body;
a dispensing tube received within the spout body and defining an outlet;
a lower reservoir configured to be supported below the mounting deck, the lower reservoir including an upper neck operably coupled to the dispensing head;
a pump assembly operably coupled to the lower reservoir and configured to pump liquid soap from the lower reservoir to the outlet of the dispensing tube;
a supply tube extending within the lower reservoir, the supply tube extending from a lower end fluidly coupled to the pump assembly to an upper end extending within the upper neck of the lower reservoir; and
a tube retainer securing the lower end of the dispensing tube to the spout body, the tube retainer including a downwardly facing funnel portion receiving the upper end of the supply tube to define a releasable fluid coupling between the dispensing tube extending above the mounting deck and the supply tube extending below the mounting deck.

22. The electronic soap dispenser of claim 21, wherein the lower reservoir includes a rib secured to the upper end of the supply tube to support the supply tube within the upper neck of the lower reservoir to define a refill opening.

23. The electronic soap dispenser of claim 21, further comprising:
a capacitive sensor operably coupled to the spout body; and
a controller in electrical communication with the capacitive sensor defining both a proximity sensor and a touch sensor.

24. The electronic soap dispenser of claim 23, wherein the controller is configured to receive an output signal from the capacitive sensor and to distinguish between a proximity output signal from the capacitive sensor when a user is positioned in a detection area near the dispensing head, and a touch output signal from the capacitive sensor when a user touches the dispensing head.

25. The electronic soap dispenser of claim 24, wherein the pump assembly operates in different dispensing modes based upon whether the controller detects the proximity output signal or the touch output signal from the capacitive sensor.

26. The electronic soap dispenser of claim 21, wherein the pump assembly includes a gear pump and a motor operably coupled to the gear pump.

27. The electronic soap dispenser of claim 26, wherein the pump assembly further includes a drive pulley coupled to the motor, a driven pulley coupled to the drive pulley, and the gear pump includes a drive gear coupled to the driven pulley, and a driven gear coupled to the drive gear.

* * * * *